United States Patent [19]
Parks et al.

[11] Patent Number: 5,877,746
[45] Date of Patent: Mar. 2, 1999

[54] USER INTERFACE FOR ALL-IN-ONE INTEGRATED OFFICE SYSTEM

[75] Inventors: Gregory A. Parks; Richard A. Parfitt, both of Los Gatos; Charlie Hill, Woodside, all of Calif.; Heiko Sacher, Singapore, Singapore

[73] Assignee: Apple Computer, Inc., Cupertino, Calif.

[21] Appl. No.: 558,375

[22] Filed: Nov. 16, 1995

[51] Int. Cl.$^6$ .............................. G09G 5/00; G06F 3/00
[52] U.S. Cl. .......................................... 345/156; 345/352
[58] Field of Search ..................................... 395/357, 354, 395/326, 352, 353; 345/156, 158, 157, 160, 168, 169, 172, 326, 352, 353, 354, 357

[56] References Cited

U.S. PATENT DOCUMENTS

| | | | |
|---|---|---|---|
| 4,902,881 | 2/1990 | Janku | 235/381 |
| 5,056,059 | 10/1991 | Tivig et al. | 345/352 |
| 5,438,433 | 8/1995 | Reifman et al. | 358/468 |
| 5,510,811 | 4/1996 | Tobey et al. | 345/157 |
| 5,530,740 | 6/1996 | Irribarren et al. | 379/89 |
| 5,559,945 | 9/1996 | Beaudet et al. | 345/353 |
| 5,572,572 | 11/1996 | Kawan et al. | 379/98 |
| 5,604,860 | 2/1997 | McLaughlin et al. | 345/326 |
| 5,615,120 | 3/1997 | Schwartz et al. | 364/464.17 |
| 5,724,069 | 3/1998 | Chen | 345/173 |

OTHER PUBLICATIONS

Letson, Russell. "More for Less (Space and Cost)", Home Office Computing, pp. 96–102, Apr. 1995.

Stone, M. David. "At the Sound of the Beep . . . ", PC Magazine, pp. 123–171, Jun. 13, 1995.

Stone, M. David. "Swiss Army Printers", PC Magazine, pp. 173–207, Jun. 13, 1995.

Van Horn, G. Armour. "Five–in–One Peripherals", BYTE, pp. 113–116, Aug. 1995.

Alfred Poor, "Multifunction Devices, Three–in–One Devices from Canon and Ricoh", *PC Magazine,* vol. 13, No. 21, p. 50, (Dec. 6, 1994).

Anush Yegyazarian, "New & Improved, News of Announced Products and Upgrades, Everything Your Office Needs—In One Package", *PC Magazine,* vol. 13, No. 5, p. 61, (Mar. 15, 1994).

Asa Somers, "New & Improved News of Announced Products and Upgrades, Xerox 3000 Series Puts Print/Fax/Scan Devices Within Reach", *PC Magazine,* vol. 14, No. 3, p. 67, Feb. 7, 1995).

(List continued on next page.)

*Primary Examiner*—Tod R. Swann
*Assistant Examiner*—Conley B. King, Jr.
*Attorney, Agent, or Firm*—Blakely, Sokoloff, Taylor & Zafman

[57] ABSTRACT

A user interacts with a computer system having a display unit, a processor, a memory and a Cartesian selection device by activating a first major feature; displaying a plurality of labels representing a plurality of options for said first major feature; selecting one of the options by manipulating the Cartesian selection device in a first axis; displaying a plurality of suboptions for the selected option; selecting one of the suboptions by manipulating the Cartesian selection device in a second axis; and selecting a second major feature by either selecting an indicia of the second major feature displayed on the display unit or using a hardbutton coupled to the processor. Both the first and second major feature comprising one of faxing, scanning, and voice mail functions. The user interface system for the computer system comprises a grid of possible user functions. The grid is made up of a plurality of rows and a plurality of columns. Each column within a row has a plurality of subrows, wherein each of the plurality of rows corresponds to a major feature of the computer system, each of the columns within each row corresponds to an option for the corresponding major feature, and each subrow within a column corresponds to a suboption. Only the active cell of the user interface system is displayed at any one time, the active cell being defined as the intersection of the selected row and column.

1 Claim, 31 Drawing Sheets

OTHER PUBLICATIONS

Alfred Poor, "First Looks Hands–On Reviews of New Shipping Products, A Space–Solving, All–in–One Solution OMS Knowledge System Prints, Scans, Faxes", *PC Magazine,* vol. 13, No. 12, pp. 37 & 39, (Jun. 28, 1994).

Lura K. Romei, "Multifunction Brings Flexibility to Office Operations", *Modern Office Technology,* pp. 26 & 30, (May 1992).

Ara C. Trembly, "Multifunction Market Set To Explode", *Managing Office Technology,* pp. 15 & 16, (Jun. 1994).

Nicola Miner, "Lexmark Delivers Jack–Of–All–Trades, Medley Acts As Color Printer, Fax/Modem, Copier, Scanner", *Infoworld,* p. 32, (Apr. 10, 1995).

FIG_1

FIG_2

FIG_3

FIG_4

FIG_5

FIG_6

FIG_7

FIG_9

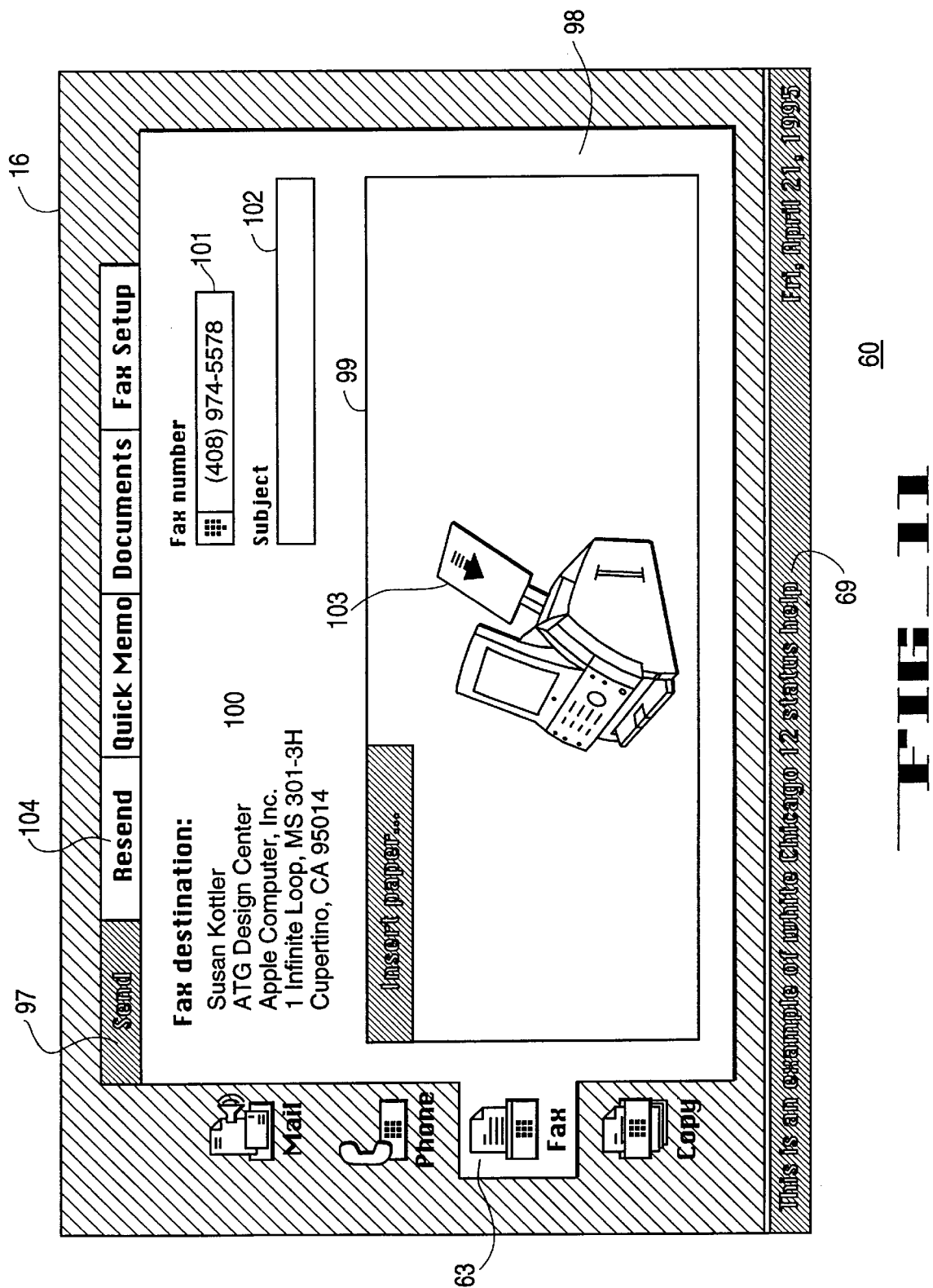
FIG_11

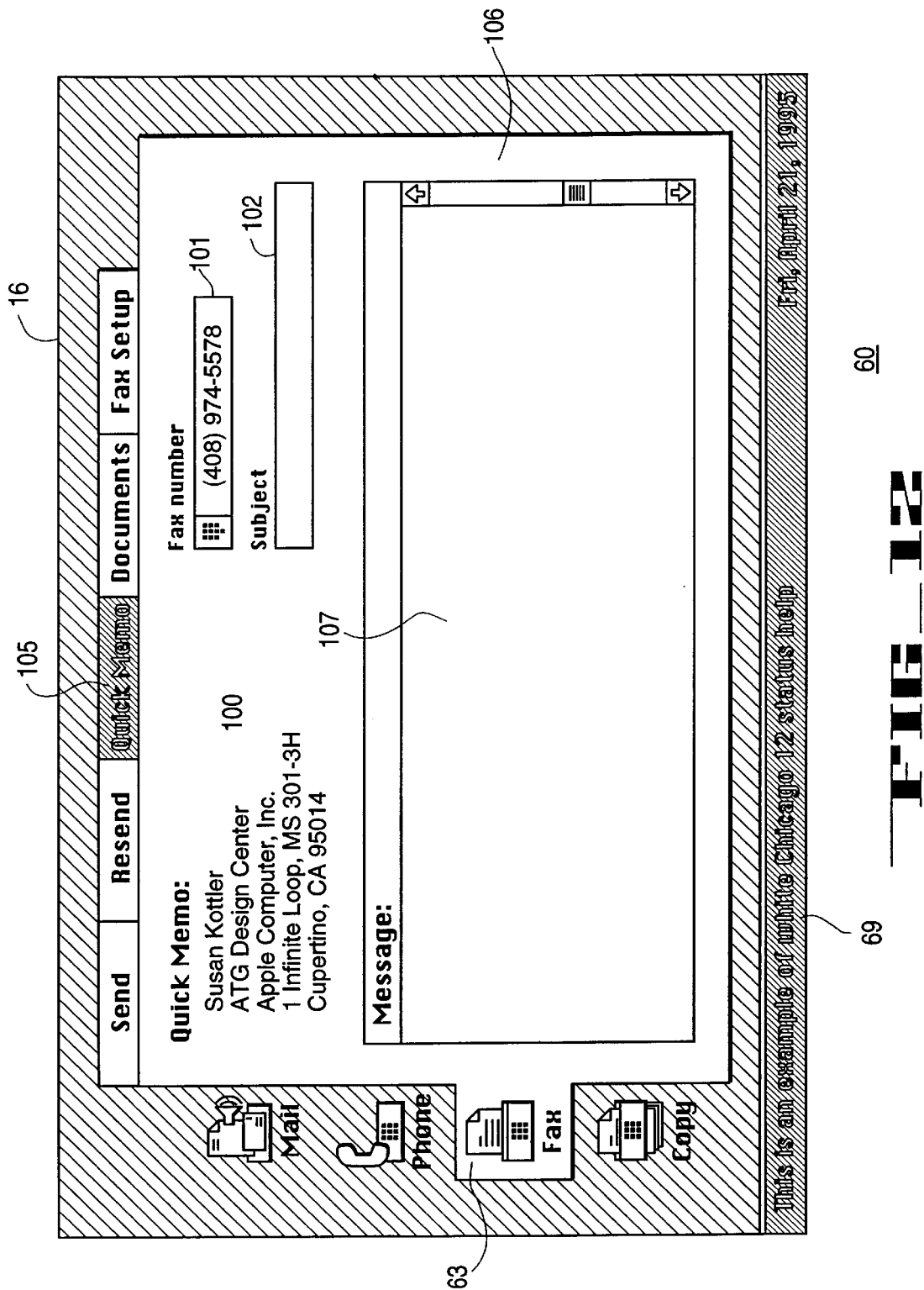
FIG_12

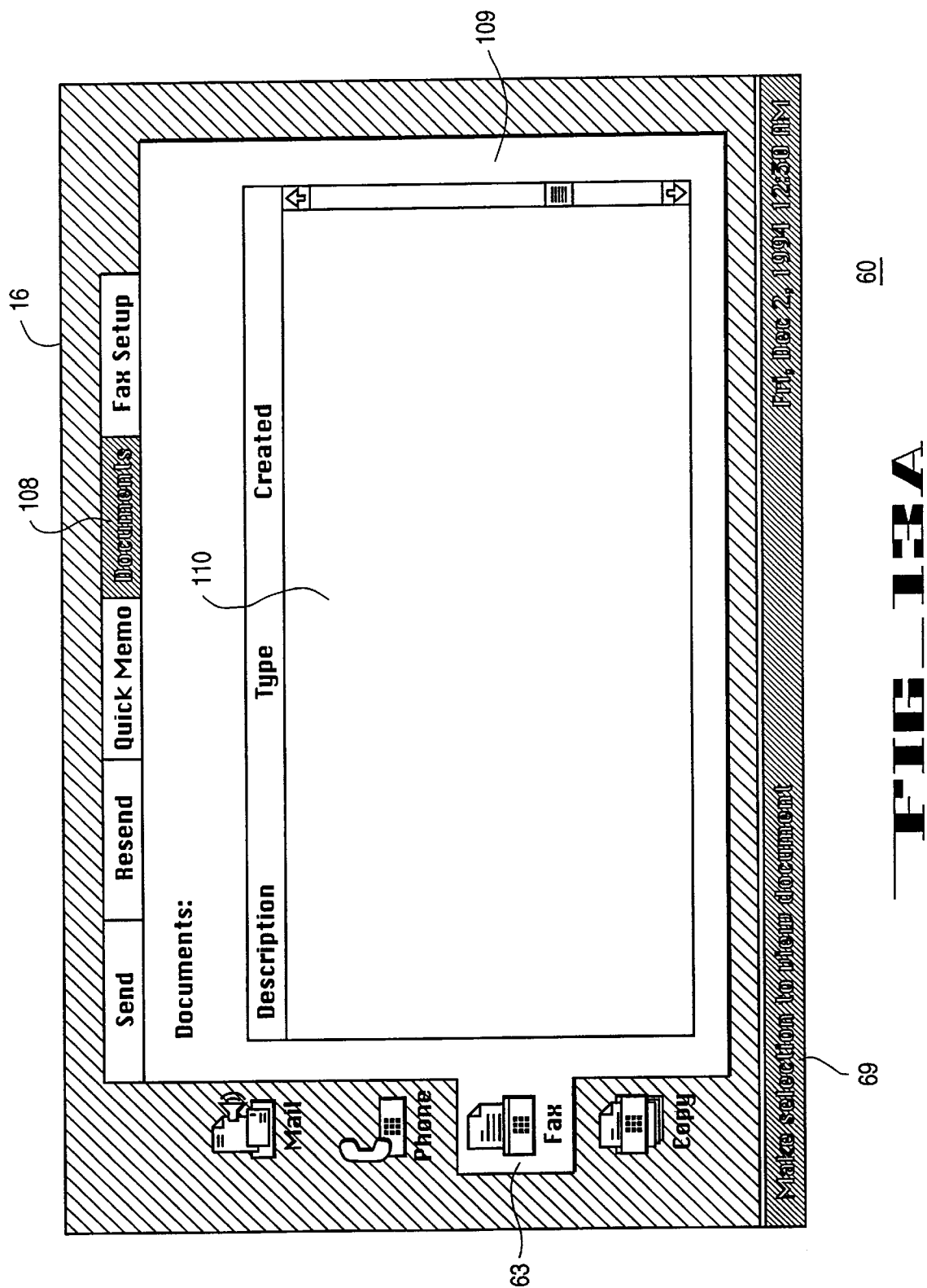
FIG_13A

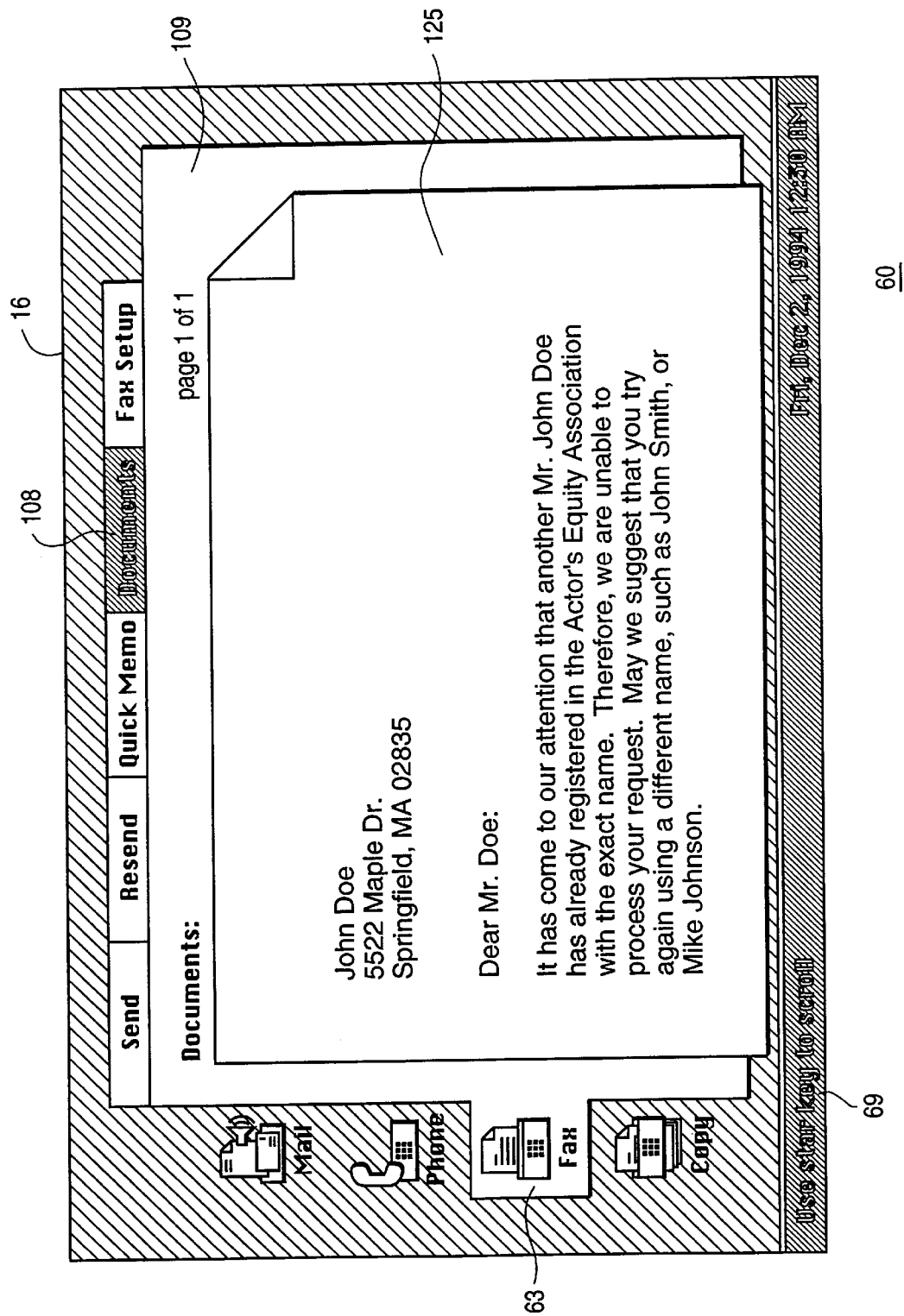
FIG._13B

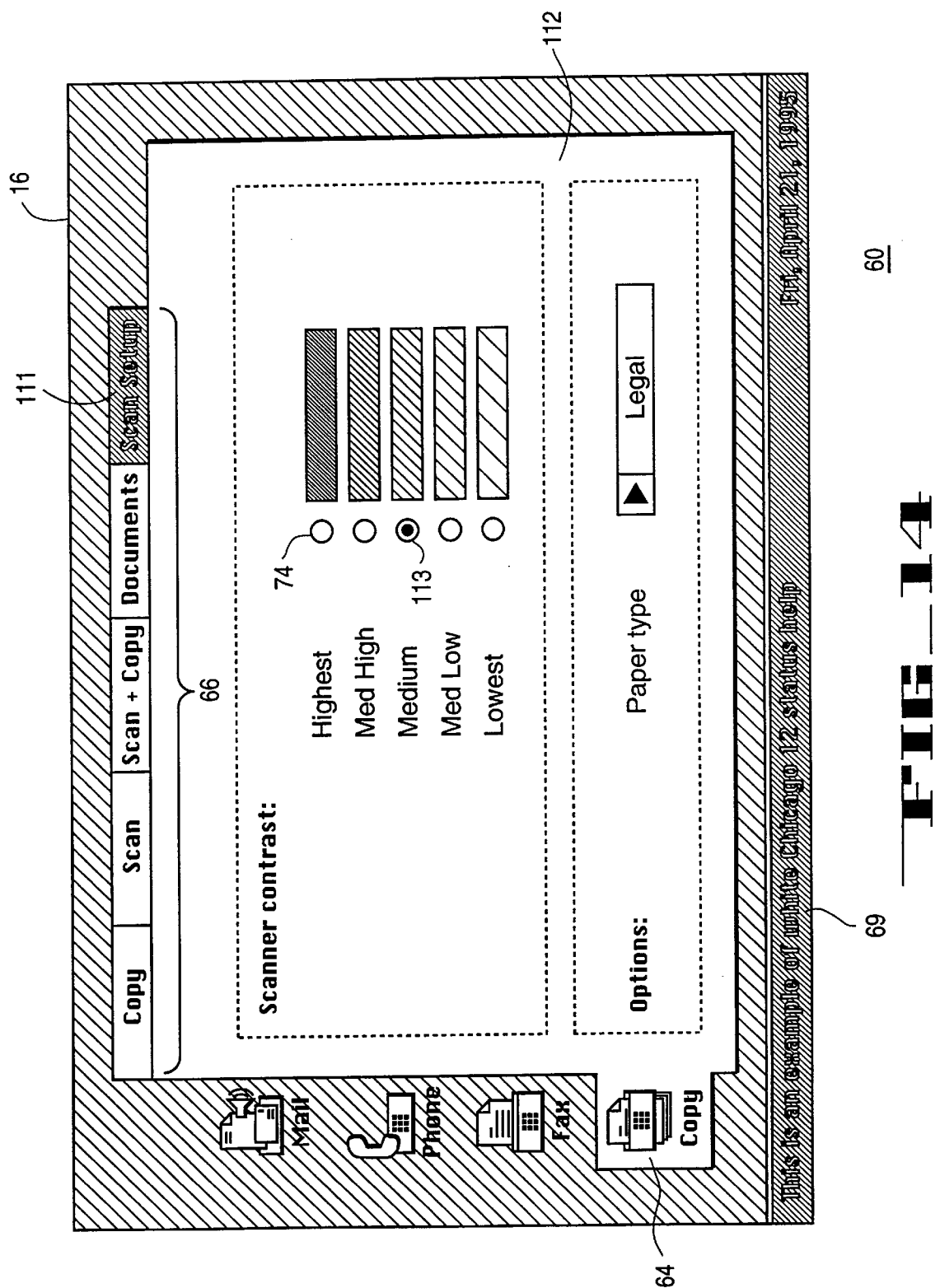

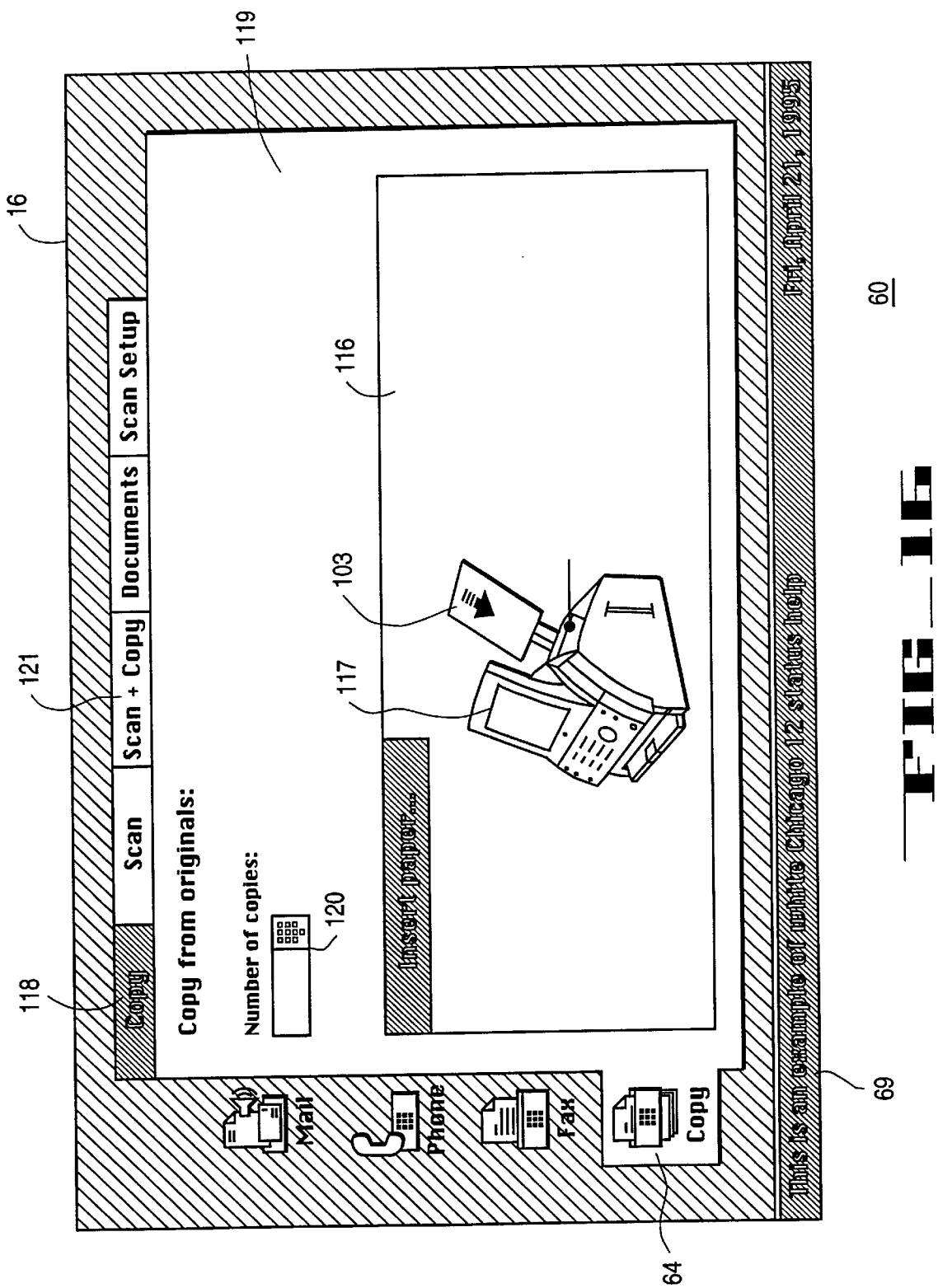
FIG_16

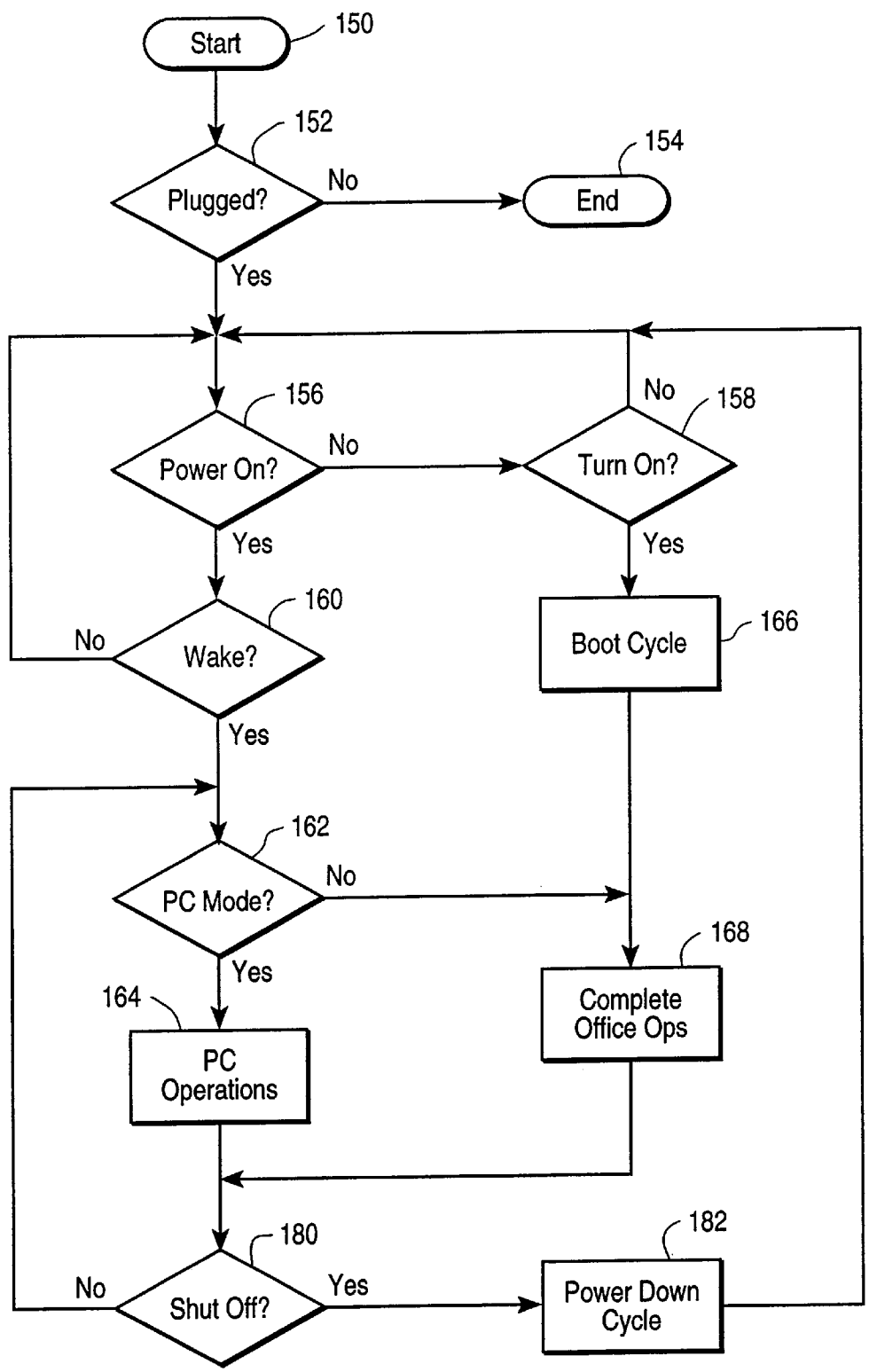
FIG_17

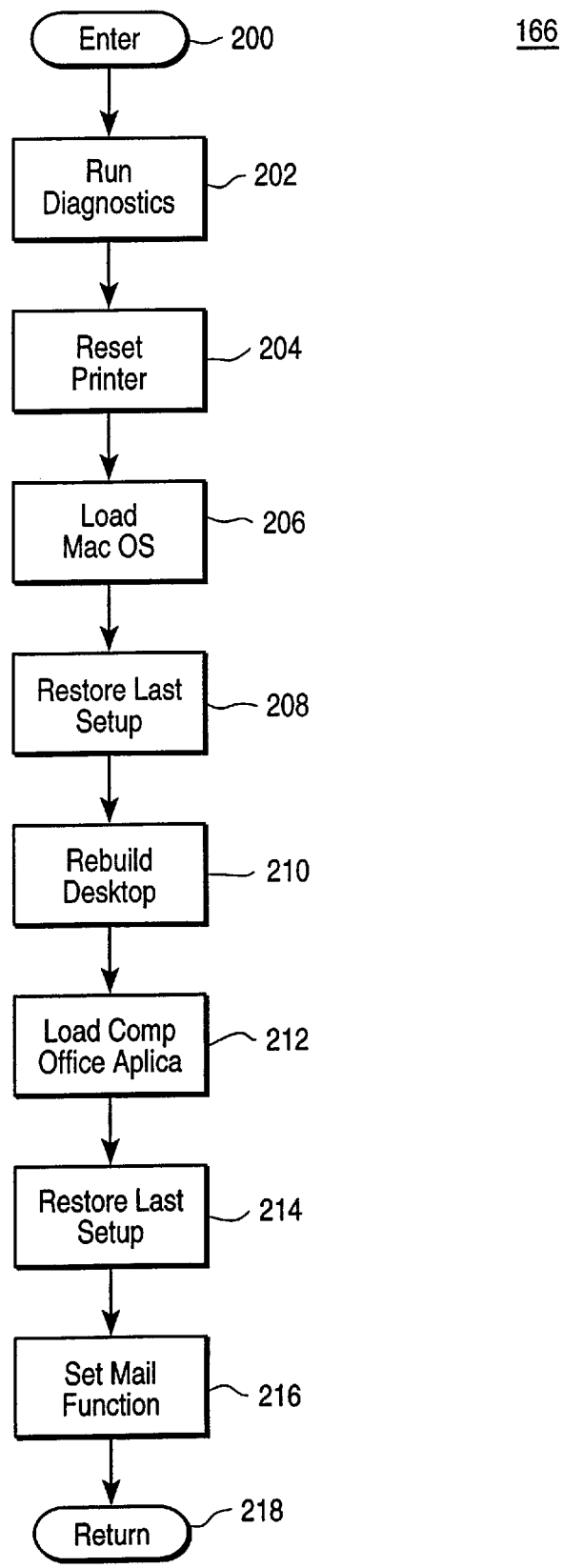
FIG_18

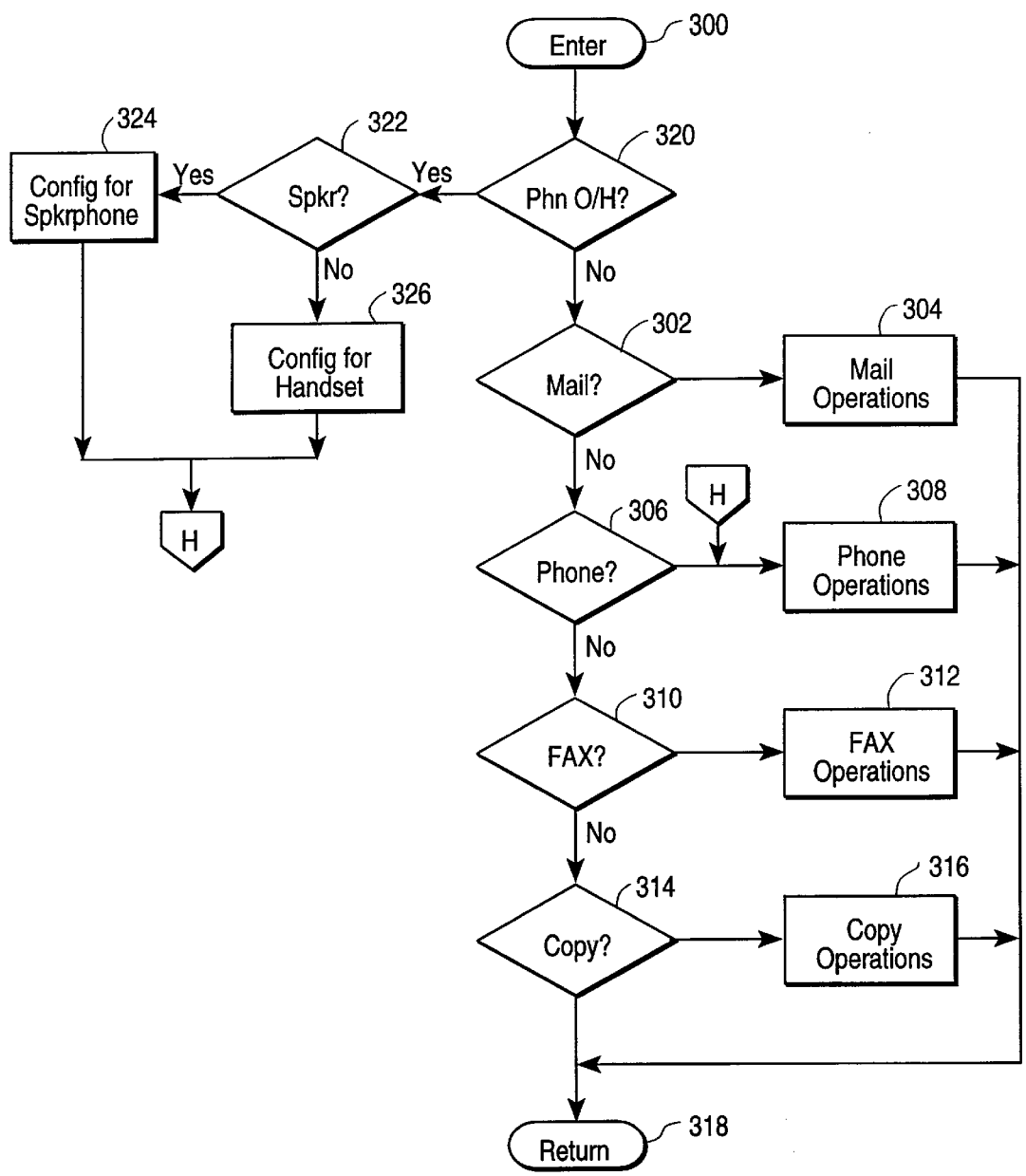
FIG_19

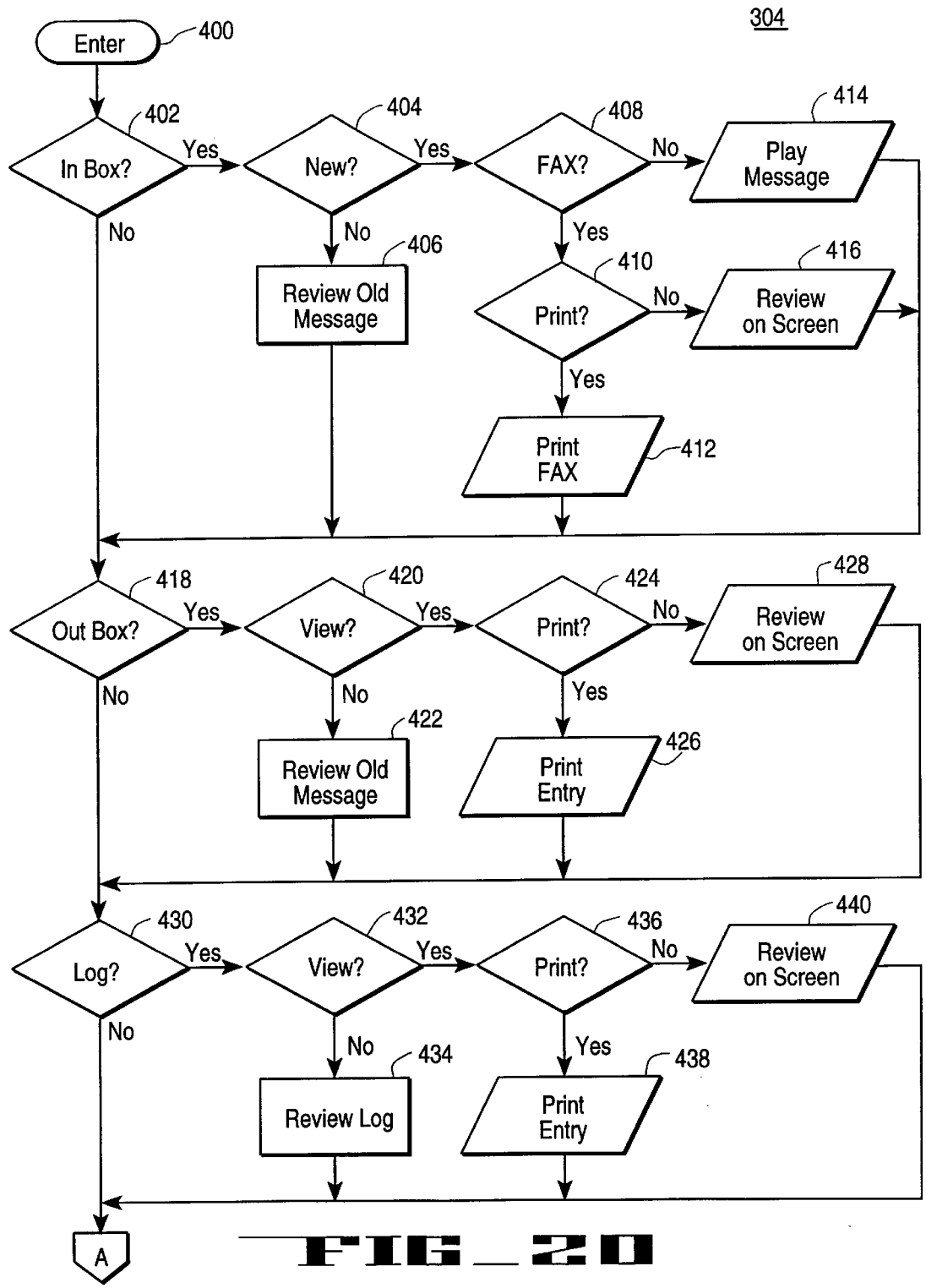
FIG_20

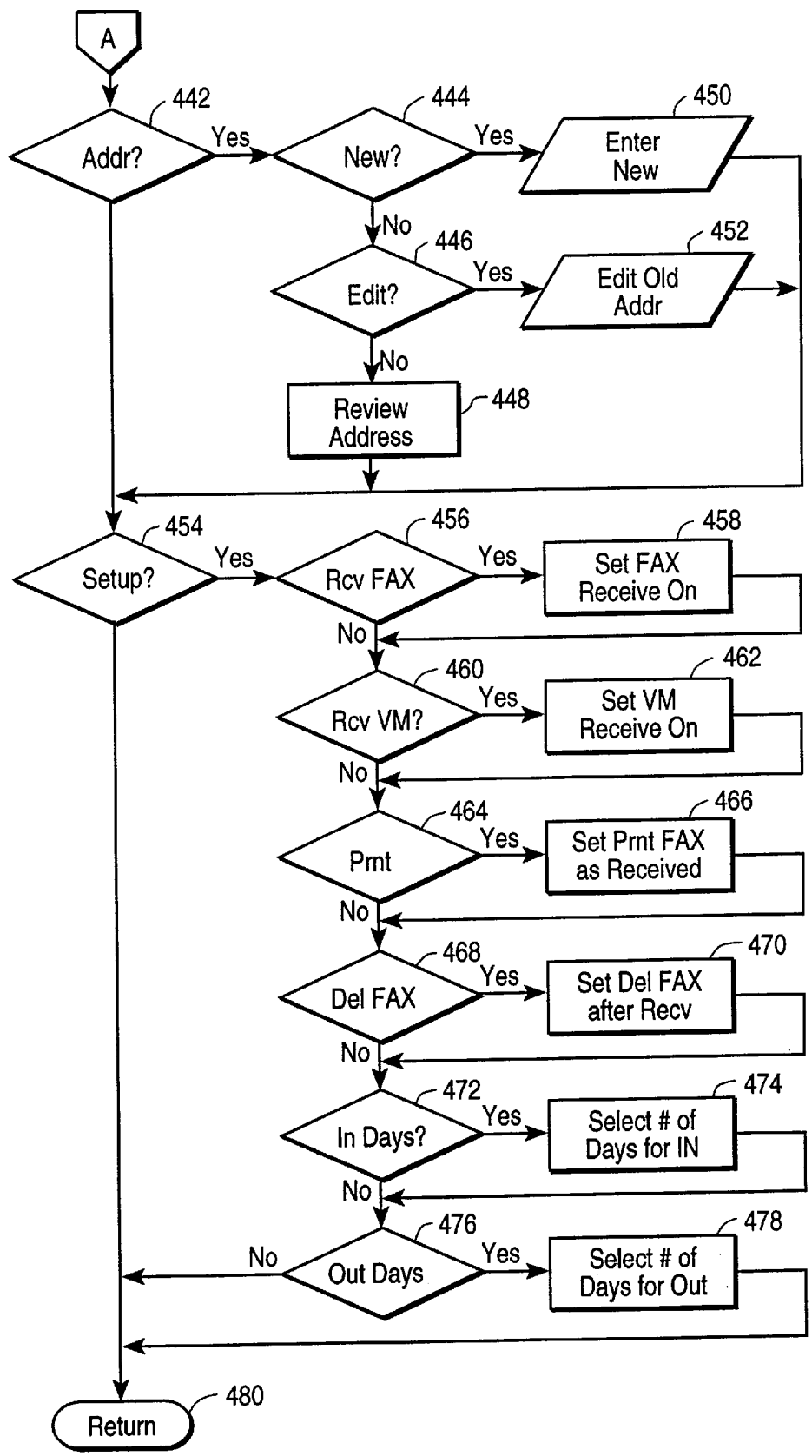
FIG_21

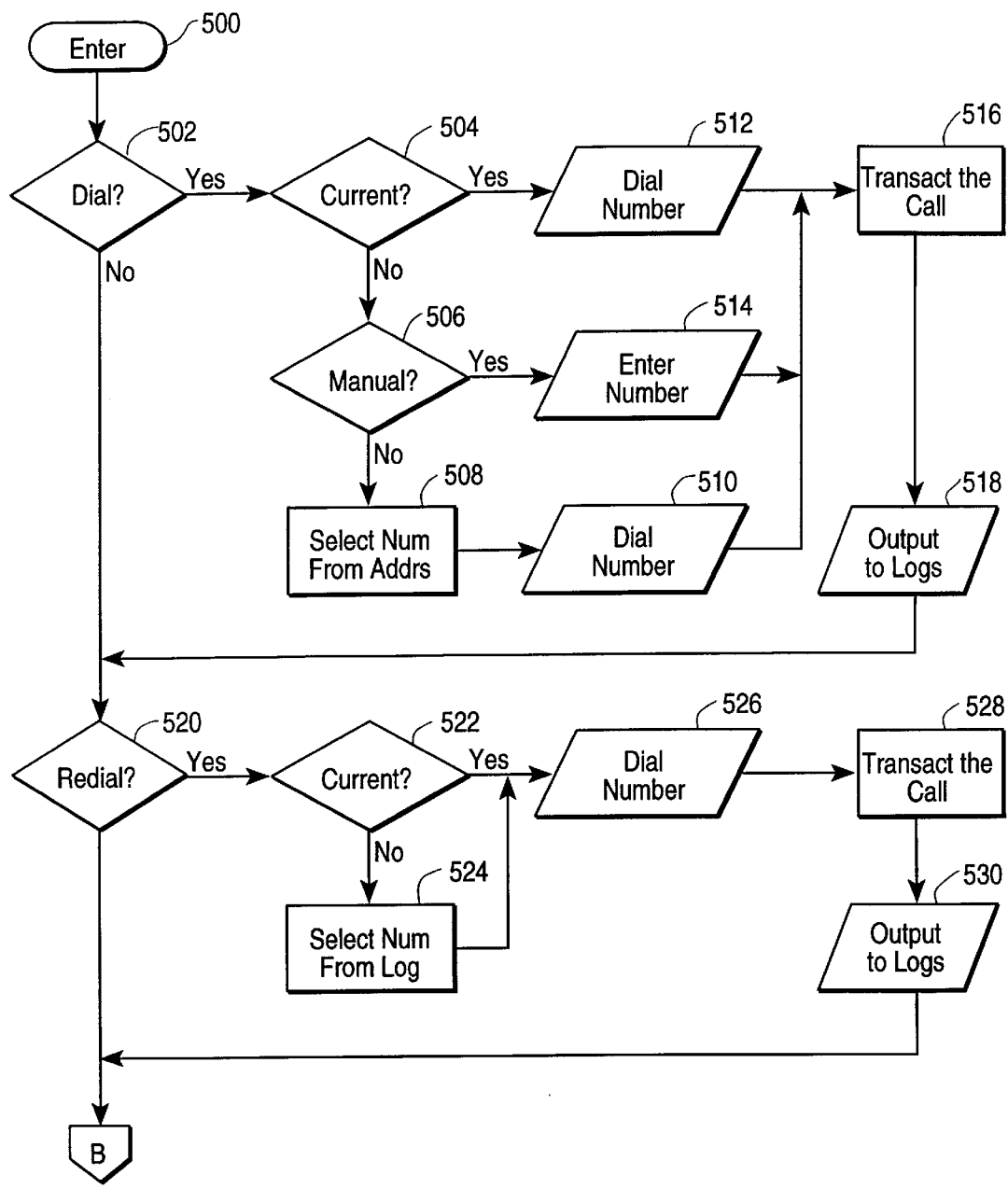
FIG_22

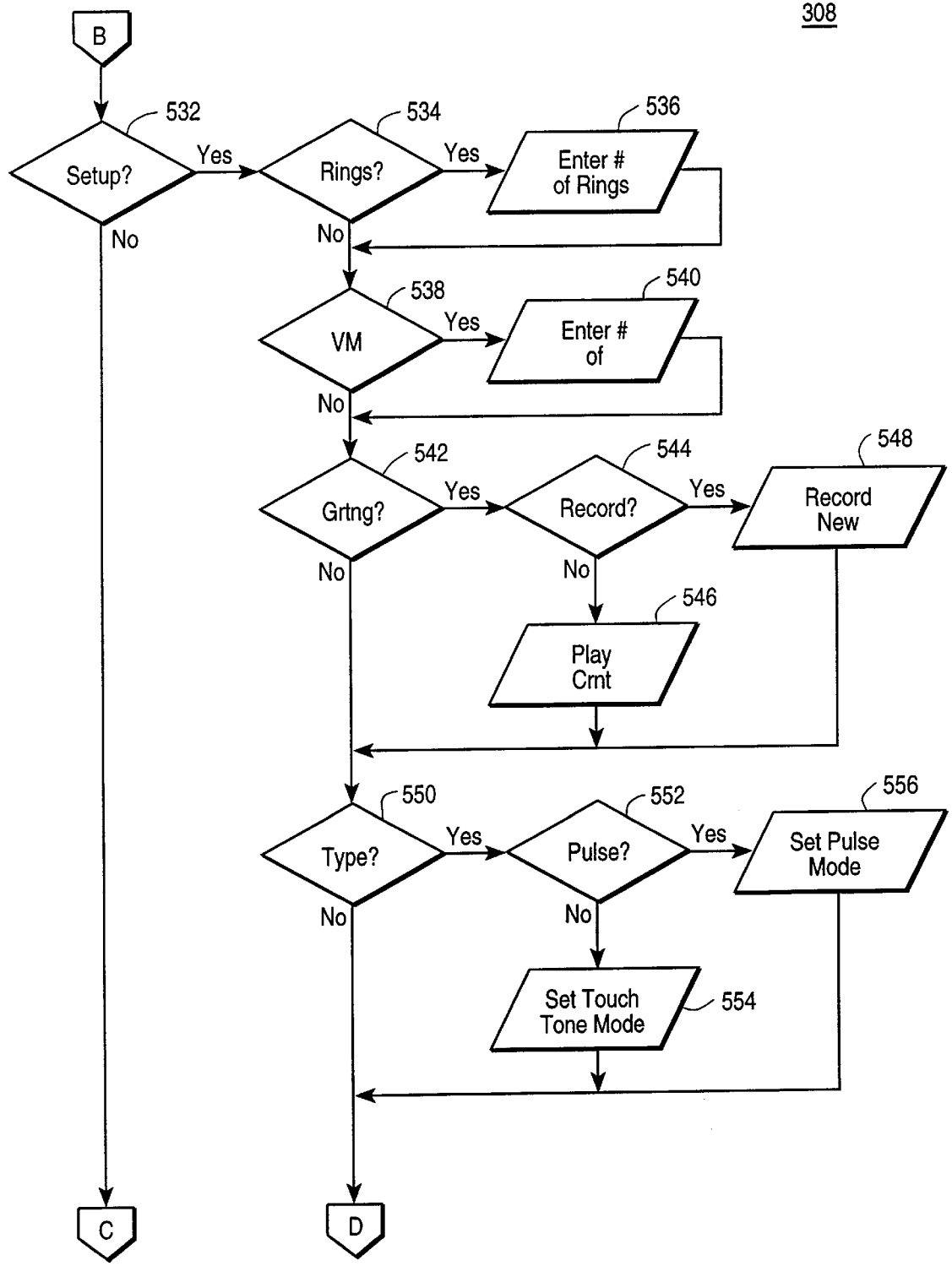
FIG_23

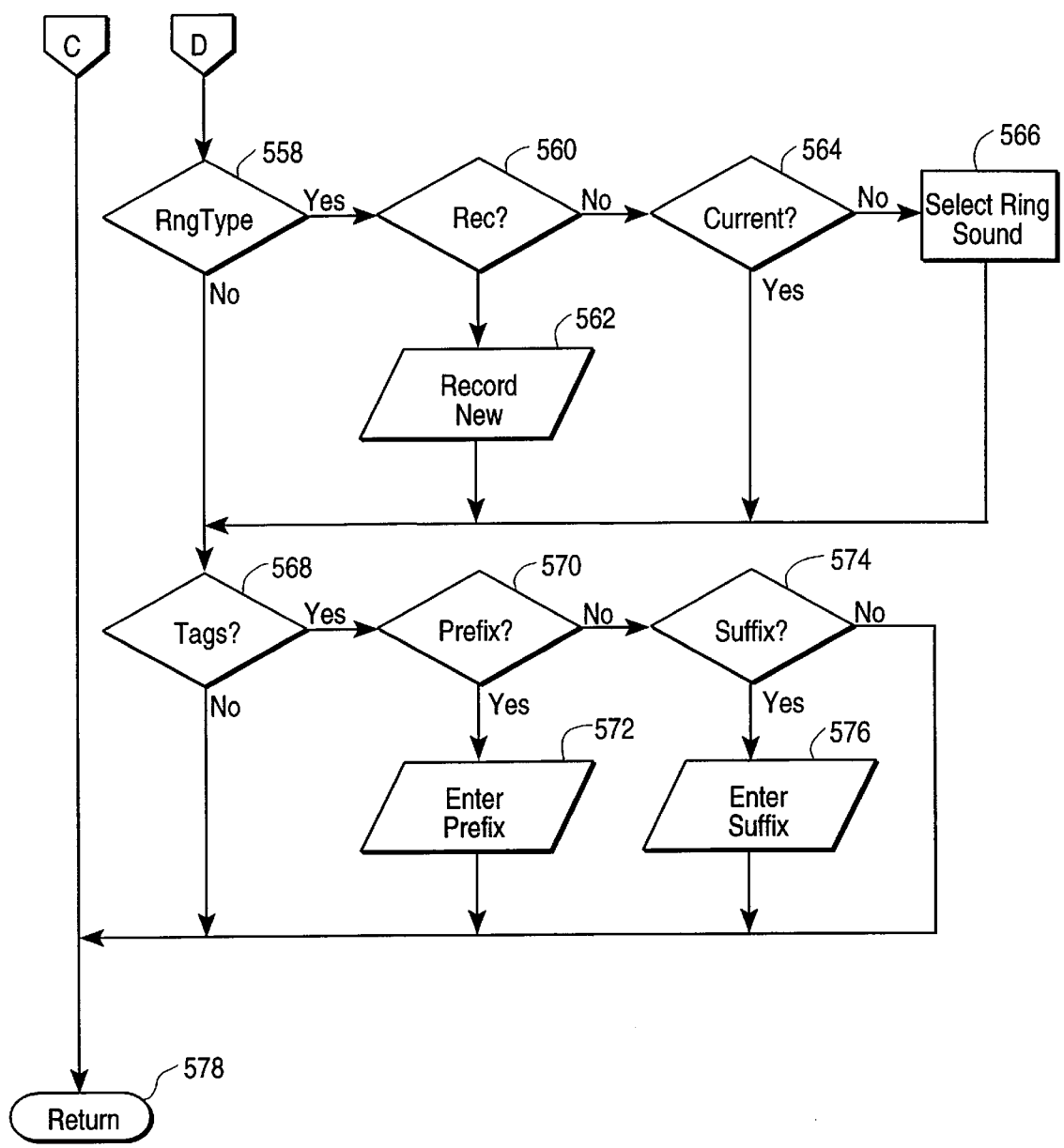
FIG_24

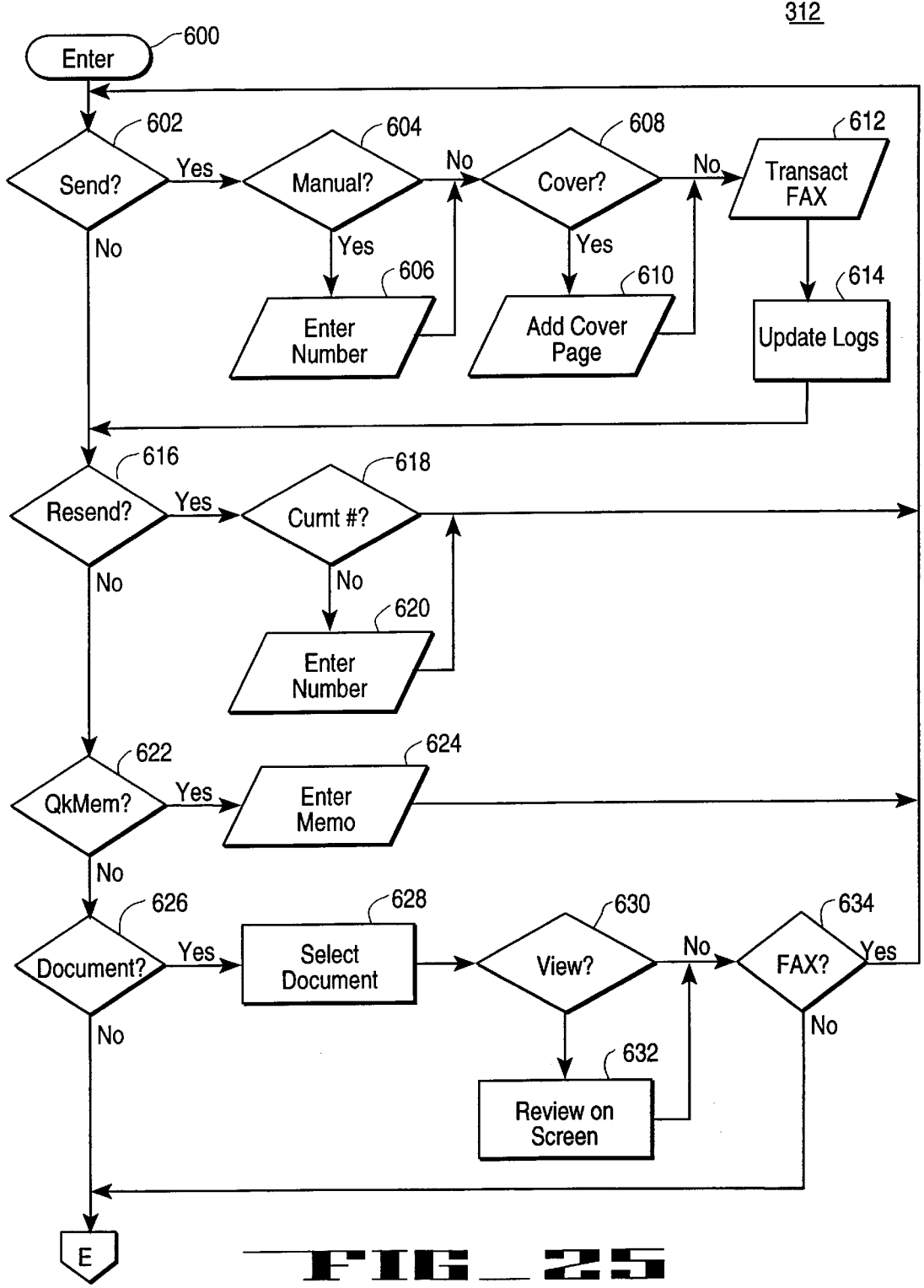
FIG_25

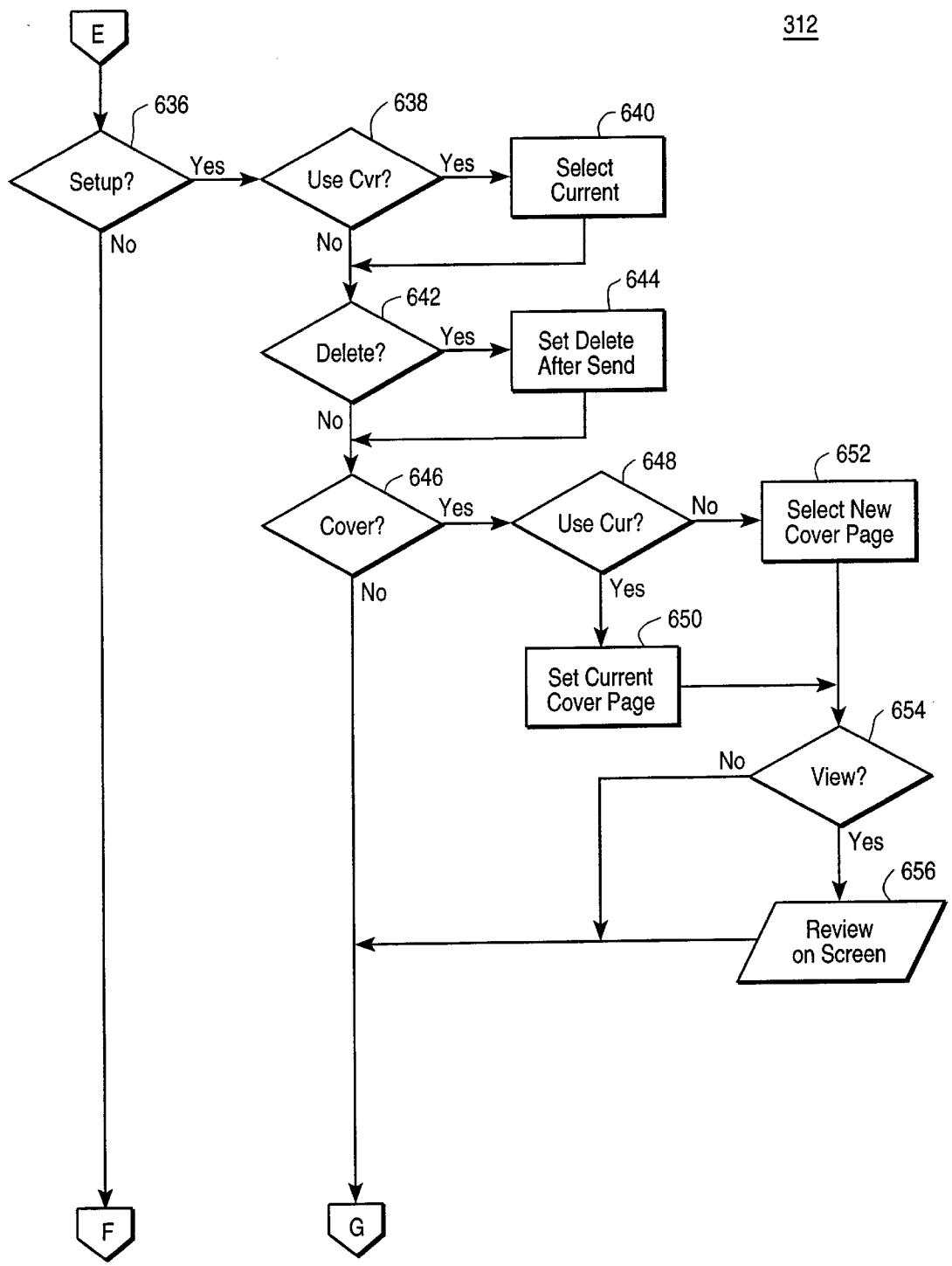
FIG_26

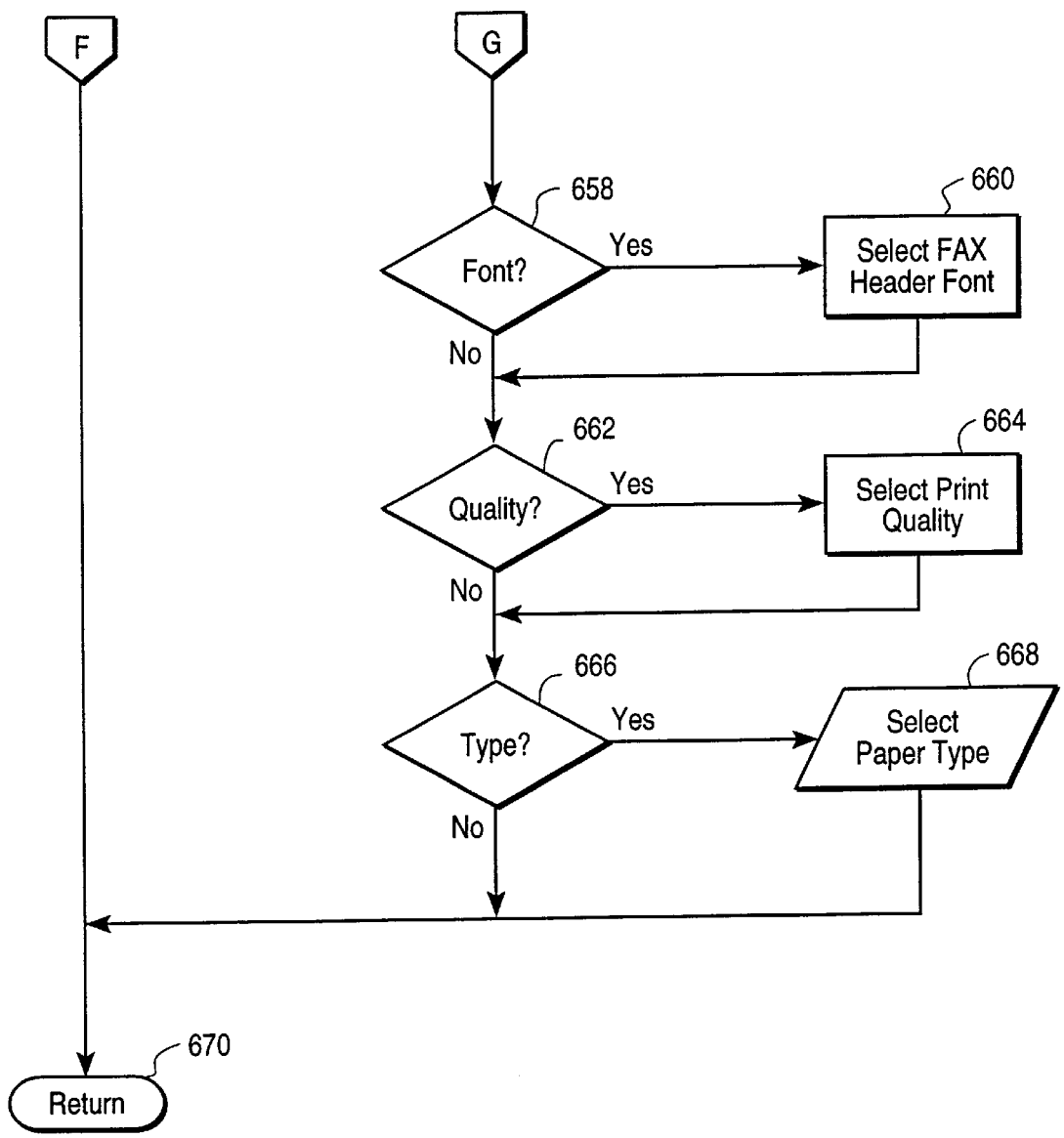
FIG_27

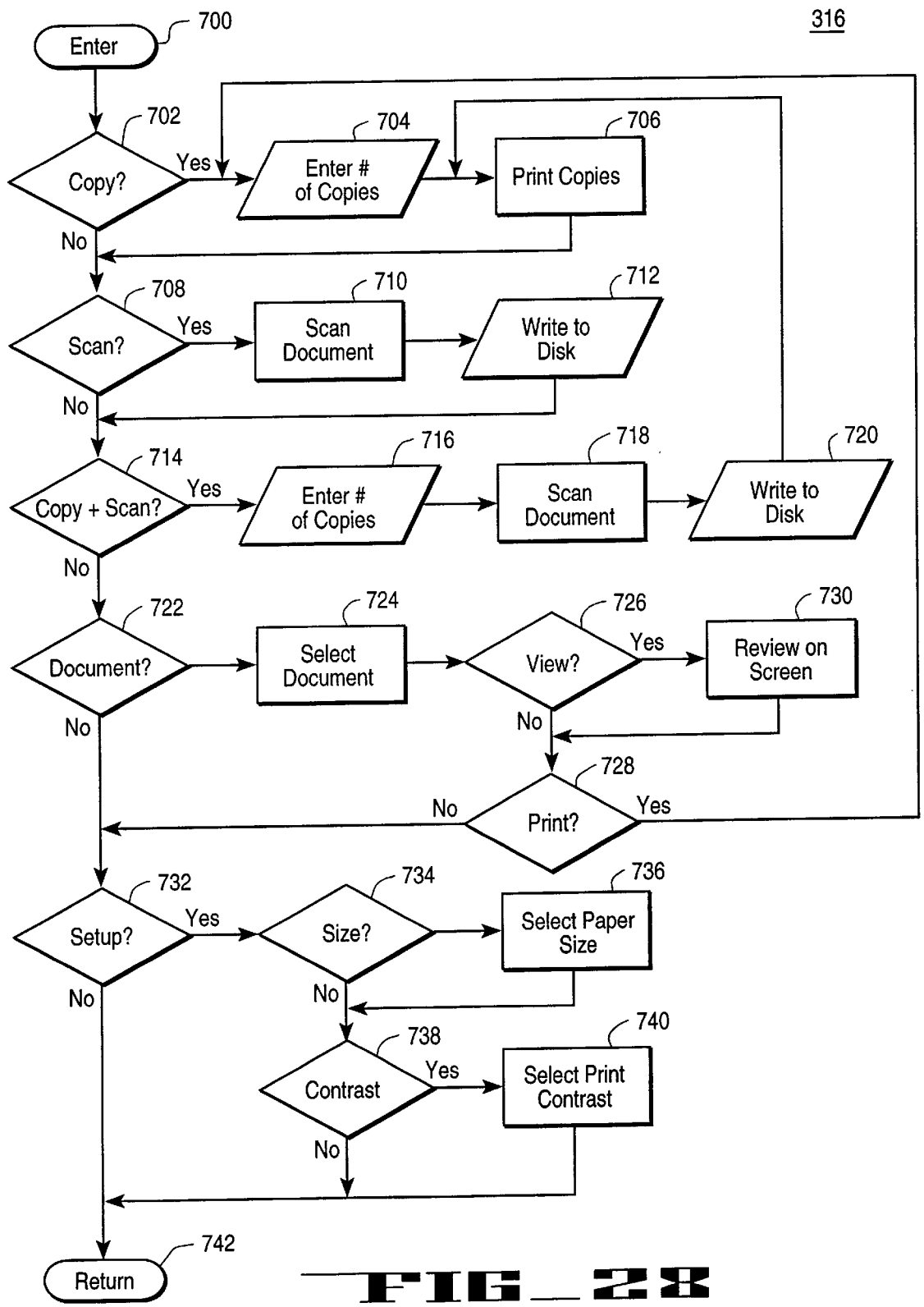
FIG_28

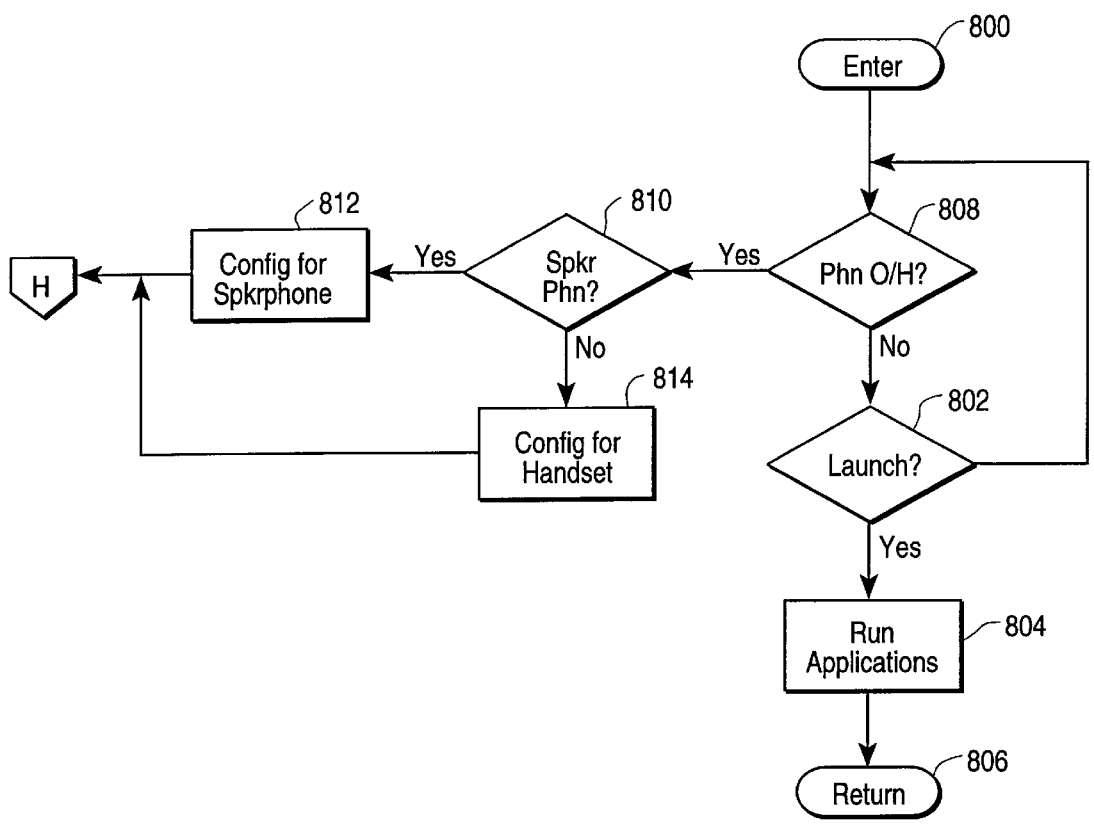
FIG_29

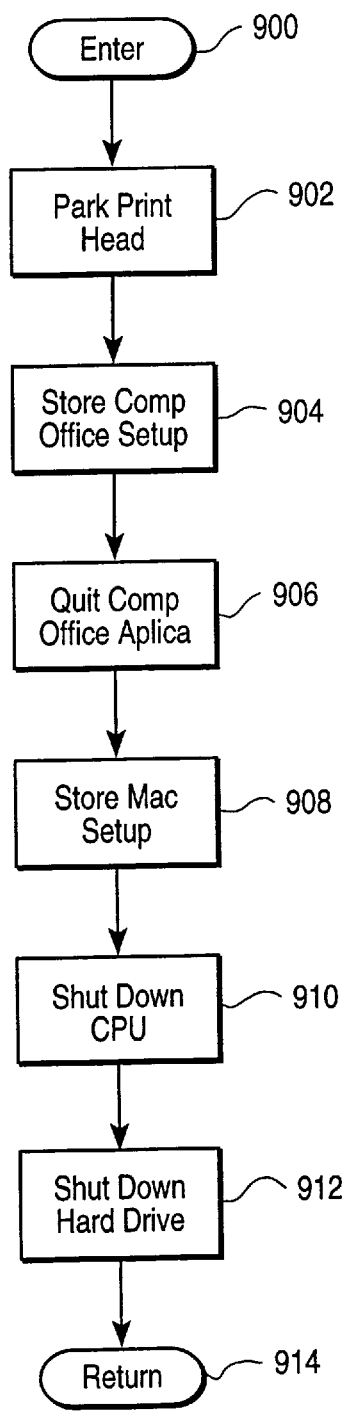
FIG_30

USER INTERFACE FOR ALL-IN-ONE INTEGRATED OFFICE SYSTEM

BACKGROUND OF THE INVENTION

1. Field of the Invention

The area of the present invention relates to a multifunction office system and, more particularly, to a user interface having a collection of different interface elements for such a system.

2. Background Art

As more and more members of today's workforce have begun working out of their homes, a need has arisen for multifunction devices which incorporate two or more types of traditional office equipment within a single enclosure. One of the first such devices was the integrated telephone/answering machine. Although originally designed and used as a stand-alone device, the answering machine was quickly integrated with the telephone to provide a single, integrated device. More recently, equipment such as facsimile machines have been combined with telephone/answering machines to provide multifunction communications devices. In addition to home offices, such devices are used in a variety of small businesses.

In addition to the integrated fax/phone/answering machine, the personal computer has become a familiar fixture in home offices and small businesses. Typically, the computer will be equipped with a fax/modem, allowing for the transfer of electronic documents. Some personal computers also are equipped to operate as a telephone and digital voice mail system.

Some manufacturers have begun offering integrated office systems that combine many of the above features. For example, the QMS 2001 Knowledge System PC, available from QMS, Inc. of Mobile, Ala. combines an incoming/outgoing fax, a laser printer and a copier with a personal computer. This type of integrated system provides a consumer with a single piece of equipment capable of performing many of the tasks required in an office environment. However, prior integrated office systems of this type often prove intimidating to persons with little or no computer experience since the systems employ user interfaces which resemble those found in personal computers.

A user interface is something which bridges the gap between a human user who seeks to control a device and the hardware and/or software which actually controls the device. The familiar keypad of a touch tone telephone and the alphanumeric keyboard associated with a personal computer are such user interfaces. In addition to hardware components, graphical user interfaces have become an increasingly common feature of personal computers. Such interfaces are provided either as built-in portions of the computer operating system, as in the case of the MACINTOSH computer available from Apple Computer Inc. of Cupertino, Calif., or as add-on software products that can be purchased separately.

Regardless of whether the user interface is a hardware device or a software program (or, as is increasingly the case, a combination of both), the purpose of the user interface is, as indicated, to bridge the gap between the human operator and the device being utilized. For example, graphical user interfaces used with personal computers often have the ability to initiate execution of other, so-called, "applications programs". Examples of application programs might be spreadsheets, word processing programs, database programs, etc. The process of initiating execution of an application program is typically handled through the use of small graphical symbols known as "icons". The graphical user interface displays the icons on the computer screen, one icon for each application program that can be run. The human user initiates execution of an application program by selecting the corresponding icon, most often using a pointing device such as a mouse.

A conventional graphical user interface such as described above significantly reduces the amount of information that a user must recall in order to effectively use the computer. For example, instead of remembering the name of an application program, and the location of the program on a particular disk, the user need only remember that a particular icon is associated with the application program.

Like their graphical counterparts, hardware user interfaces also allow for ease of operation. For example, the familiar mouse associated with a personal computer allows a user to position the cursor and select from among the various icons displayed on a screen. By using the mouse the user is able to avoid having to perform a number of complex keystrokes.

In addition to graphical user interfaces, computer systems often provide user assistance in the form of help functions. Such functions are available in many operating systems and application programs. For example, some systems provide context sensitive "balloon help" where a user can learn more about an object represented on a computer screen by simply pointing to the object. Other applications programs provide a help menu which allows a user to select a help topic. Still other systems will ask users if they need help if it appears that they need help.

Conventional help functions are useful adjuncts to system and application software. They provide a convenient access to helpful information without requiring a user to study a detailed reference manual. However, such help functions tend to be quite limited. They typically are only passive providers of information and do not aid a user in accomplishing a desired task unless specifically selected.

Although graphical user interfaces and help functions generally provide for easier use of personal computers, a number of people, especially those with little or no computer training, are still reluctant to use personal computers. For many people there is nothing intuitive about graphical user interfaces which require one to use a mouse to select icons or pull down menus. Although many office workers are familiar with keyboards, when the keyboard becomes coupled to a personal computer it can present an intimidating object insofar as cryptic commands must be entered in order to access the computer's functions.

Integrated office systems have gained some popularity among computer savvy users, however, they offer little assistance for non-computer users. In part, this is due to the fact that these integrated systems rely on preexisting forms of user interfaces which, although familiar to computer users, are completely foreign to many people. For example, although the QMS 2001 Knowledge System provides front panel controls for a user to choose the number of copies and start/stop the copying process, all other functions must be accessed through software based on the Windows operating system developed by Microsoft Corporation of Redmond, Wash. This operating system provides a graphical user interface that must be accessed via the keyboard and/or a cursor pointing device. For many users, this will be an intimidating prospect and one which many will avoid altogether.

Accordingly, there exists a need for an integrated office system which combines the features of traditional office equipments and a personal computer but supports a user interface which non-computer savvy users will find easy to use.

SUMMARY OF THE INVENTION

A method for interacting with a computer system having a display unit, a processor, a memory and a Cartesian selection device is described. In one embodiment, the user begins by activating a first major feature of the computer system. The computer has a plurality of major features and activation of one of these major features is accomplished, in one embodiment, using a hardbutton coupled to the processor. Other activation methods are also possible.

Once the first major feature has been activated, a plurality of labels representing a plurality of options for the first major feature are displayed. The user selects one of these labels, in one embodiment, by manipulating a Cartesian selection device in a first axis. The Cartesian selection device permits a user to select from among the options but does not allow the user to switch to a new major feature.

When an option is selected, a plurality of suboptions for the option are displayed. The user selects one of these suboptions by manipulating the cartesian selection device in a second axis. The Cartesian selection device operates in orthogonal axes, thereby allowing the user to use the same device to select from among the suboptions of the selected option without changing options.

A second major feature is selected either by selecting an indicia of the second major feature displayed on the display unit (e.g., clicking on an icon) or by using a hardbutton coupled to the processor. Both the first and second major features comprise one of faxing, scanning, and voice mail functions.

A user interface system for one embodiment of the computer system comprises a grid system. The grid represents possible user functions for the computer system and consists of a plurality of rows and columns. Each column within a row has a plurality of subrows. The plurality of rows corresponds to the major features of the computer system. The columns within each row correspond to options for the corresponding major feature and each of the subrows within a column correspond to suboptions for the corresponding option.

BRIEF DESCRIPTION OF THE DRAWINGS

FIG. 11 illustrates the SEND menu of the present invention and shows an animated help illustration.

FIG. 12 illustrates the QUICK MEMO menu of the present invention.

FIG. 13a illustrates the DOCUMENTS menu of the Fax feature of the present invention.

FIG. 13b illustrates a document displayed for review within the workspace of the present invention.

FIG. 14 illustrates the SCAN SETUP menu of the present invention.

FIG. 16 illustrates the COPY menu of the present invention and shows an animated help illustration.

FIG. 17 is a flow diagram of the overall operation of the integrated office system of the present invention.

FIG. 18 is a flow diagram of the boot cycle of the integrated office system of the present invention.

FIG. 19 is a flow diagram of the office environment of the present invention.

FIGS. 20 and 21 are flow diagrams of the Mail feature operations of the present invention.

FIGS. 22, 23 and 24 are flow diagrams of the Phone feature operations of the present invention.

FIGS. 25, 26 and 27 are flow diagrams of the Fax feature operations of the present invention.

FIG. 28 is a flow diagram of the Copy feature operations of the present invention.

FIG. 29 is a flow diagram of the computer environment operations of the present invention.

FIG. 30 is a flow diagram of the power down sequence for the present invention.

DETAILED DESCRIPTION OF THE INVENTION

Figure 1:
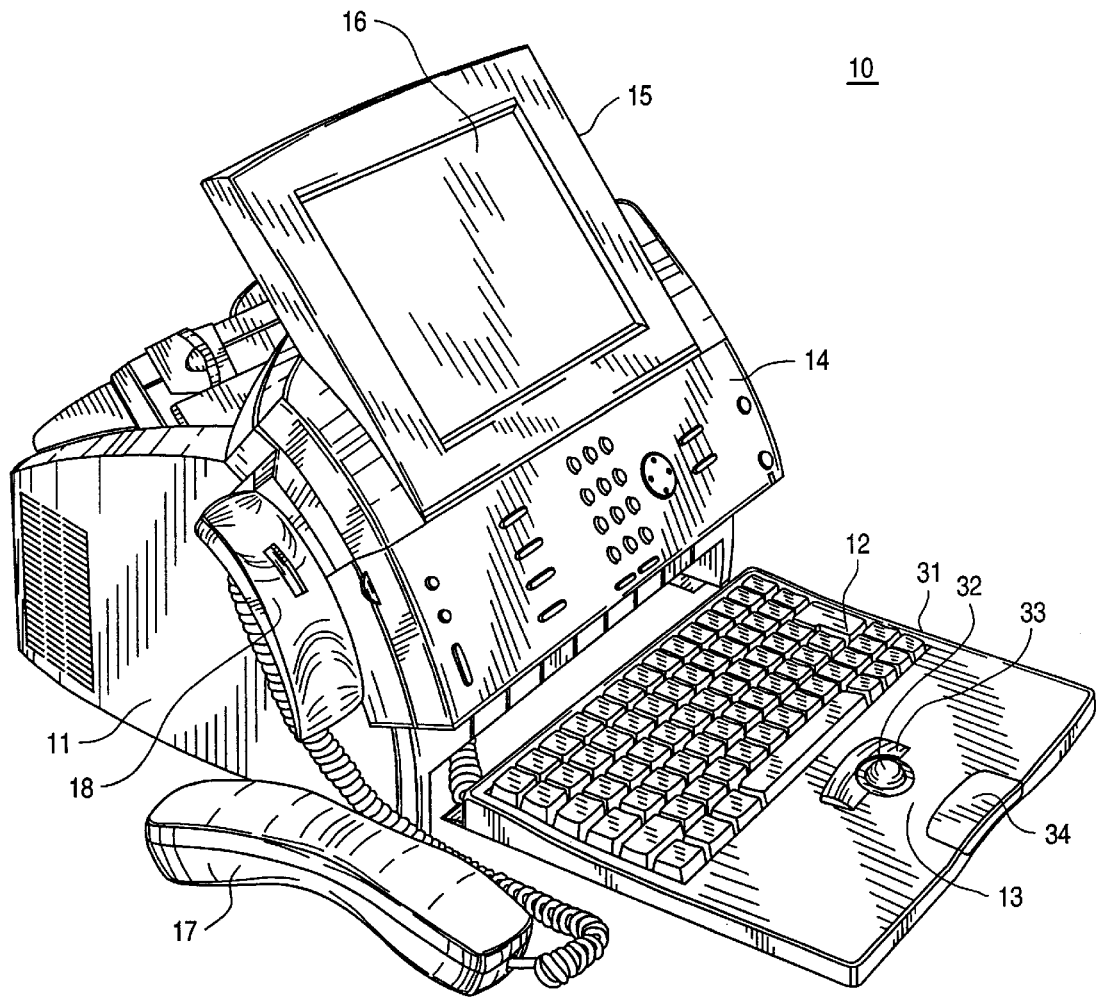
FIG. 1 is a front perspective view of the integrated office system of the present invention and shows a preferred housing.

Referring to the drawings in detail wherein like numerals designate like parts and components, the following description sets forth numerous specific details in order to provide a thorough understanding of the present invention. However, after reviewing this specification, it will be apparent to those skilled in the art that the present invention may be practiced without these specific details. In other instances, well known structures, techniques and devices have not been described in detail in order to not unnecessarily obscure the present invention.

The present description includes material protected by copyrights, including illustrations of graphical user interface images which the assignee of the present invention owns. The assignee hereby reserves its rights, including copyright, in these materials. The copyright owner has no objection to the facsimile reproduction by anyone of the patent document or the patent disclosure, as it appears in the Patent and Trademark Office file or records, but otherwise reserves all other rights whatsoever.

I. System Overview

FIG. 1 illustrates an all-in-one integrated office system 10 implementing the user interface of the present invention. Although the user interface of the present invention can be used with any number of integrated or stand-alone systems or devices, integrated office system 10 represents a preferred embodiment of the platform for the user interface since integrated office system 10 supports low-volume copying, faxing, scanning and printing of documents. It also functions as a digital voice mail system and telephone. That is, integrated office system 10 supports virtually all of the functions required for a home office or small business. Since it is powered by a central processing unit (CPU), integrated office system 10 also functions as a general purpose personal computer, however, knowledge of the computer's user interface is not required to operate the other office features.

As shown in FIG. 1, integrated office system 10 comprises a main housing 11. Main housing 11 is made from a suitably durable material and has a minimum footprint so that it does not require a significant amount of desk space. Inside main housing 11 are all of the essential and well known electronic circuitries and devices for the integrated office system's operation. This includes all of the essential circuitry for a personal computer, including a host CPU, memory, hard disk drive, floppy disk drive, input/output circuitry, power supply, and associated control circuitry. In a preferred embodiment, this circuitry comprises the familiar MACINTOSH Computer from Apple Computer, Inc. of Cupertino, Calif.

Figure 3:
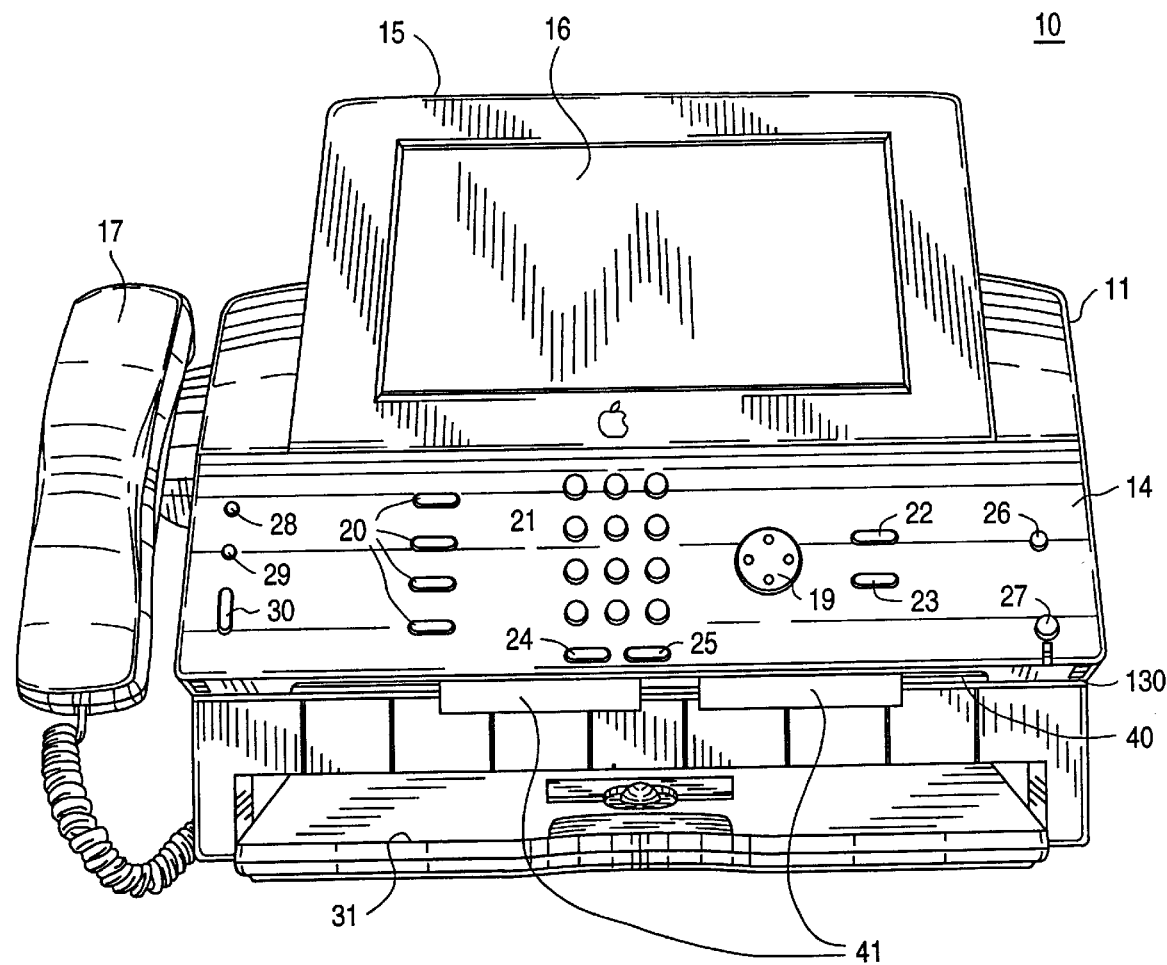
FIG. 3 is a front view of the integrated office system of the present invention and shows the front panel controls of a preferred embodiment.

Centrally located on the front part of main housing 11 is a front panel 14. Referring briefly to FIG. 3, front panel 14 supports a plurality of hardbuttons 20, a four-way "navigation button" 19, a telephone keypad 21 and other buttons and switches 22–30, all of which make up part of the user interface of the present invention.

Referring again to FIG. 1, integrated office system 10 is equipped with a combination keyboard/cursor control device 31. This combination 31 includes a conventional keyboard 12 and a cursor control device 13. In a preferred embodiment, cursor control device 13 includes a cursor positioning trackball 32 and two switches which are actuated by two contoured buttons, 33 and 34. Keyboard 12 and cursor control device 13 comprise part of the user interface of the present invention and allow a user to communicate with the personal computer portion of integrated office system 10. As will be described in detail below, keyboard 12 and cursor control device 13 also allow a user to communicate with the other elements of integrated office system 10, however, use of keyboard 12 and cursor control device 13 is not required for such functions. Although any keyboard 12 and cursor control device 13 could be used with integrated office system 10, in a preferred embodiment, these items are integrated into one unit 31 such as that depicted in FIG. 1. Such a grouping allows the integrated unit to be stored in a cavity of main housing 11, underneath front panel 14. In this way, the integrated keyboard/cursor control device 31 does not take up any extra desk space when not in use.

Located above front panel 14 is a display housing 15 which contains the display screen 16. Display housing 15 is coupled to main housing 11 by a conventional hinge means, thereby allowing display housing 15 to move in order to accommodate user convenience.

Display housing 15 includes a display unit which contains a display screen 16 and associated display circuitry (not shown). In a preferred embodiment, display screen 16 is a liquid crystal display unit. It will be appreciated by those skilled in the art, however, that in other embodiments, display screen 16 can be any one of a number of other display devices, such as a video monitor. When integrated office system 10 is in use, the menus which comprise part of the user interface of the present invention are displayed on display screen 16 and an associated cursor can be moved on the screen using cursor positioning trackball 32 in the familiar fashion. Also, when front panel controls 19–30 are activated, the results are displayed on display screen 16 as described further below.

On the left side of main housing 11 (viewing the integrated office system 10 from the front) is a telephone handset rest 18 and an associated telephone handset 17. In FIG. 1, telephone handset 17 is shown off-hook in order to provide a clear view of telephone handset rest 18. As will be described further below, when telephone handset 17 is taken off-hook, integrated office system 10 immediately goes to the Phone mode in anticipation of a user's desire to place or answer a telephone call. When in Phone mode, an associated menu is displayed on screen 16 and various functions are available to a user through the use of front panel controls 19–30.

Figure 2:
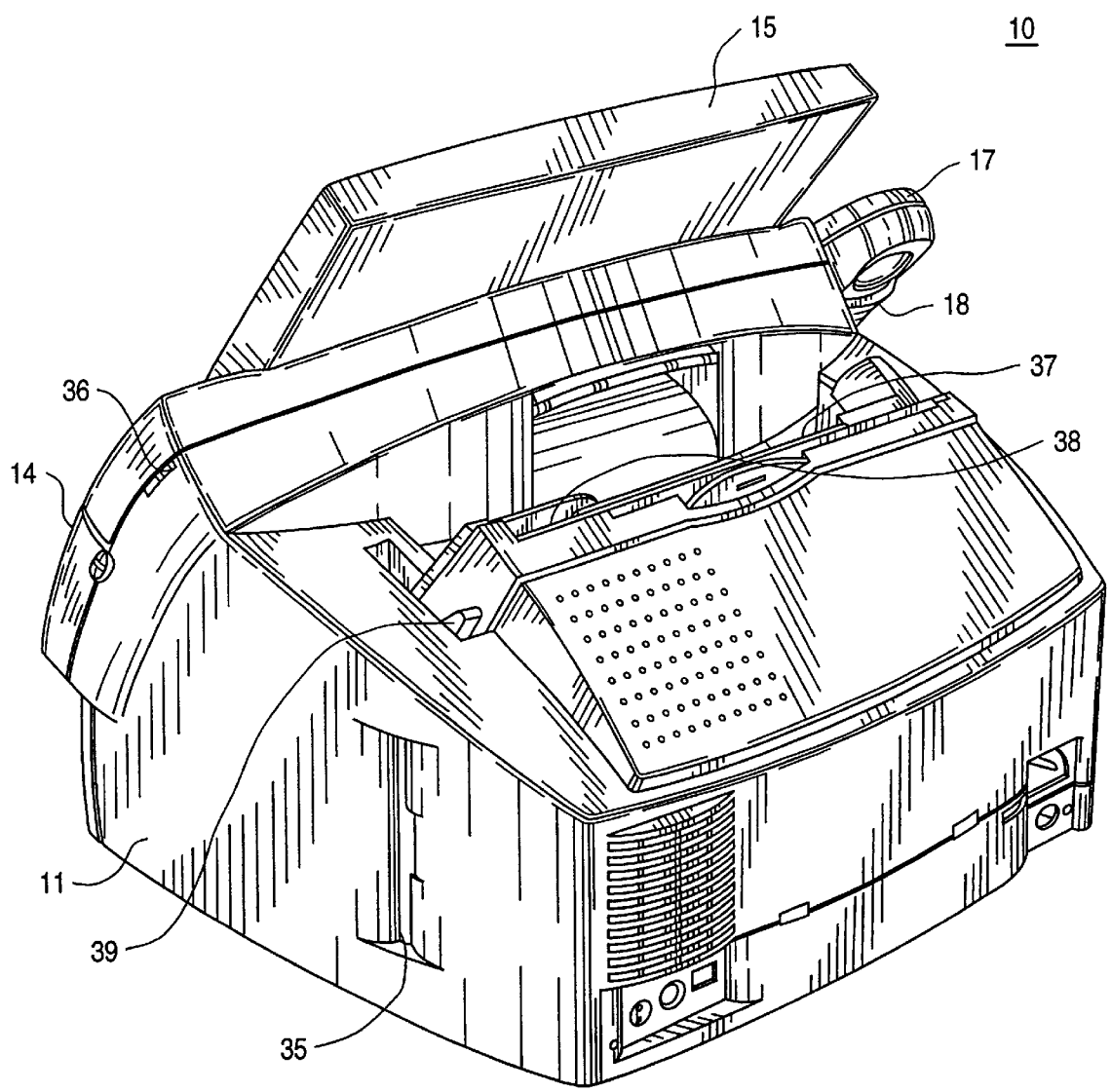
FIG. 2 is a rear perspective view of the integrated office system of the present invention.

Referring now to FIG. 2, a right side and rear perspective view of integrated office system 10 is shown. On the right side of main housing 11 is a slot 35 which forms part of a conventional floppy disk drive. Slot 35 provides an opening in main housing 11 which allows a floppy disk to be inserted into the floppy disk drive.

Also on the right side of main housing 11, located just above front panel 14, is a conventional rotating control which may be used to vary the brightness of display screen 16 in the conventional manner.

On the upper rear part of main housing 11 are located two sheet feeders 37 and 38. These sheet feeders provide paper paths to the scanner and printer mechanisms of integrated office system 10 and are used in conjunction with copying, scanning and printing operations. Front sheet feeder 37 is used to load original documents for scanning and/or copying. Rear sheet feeder 38 is used to load blank paper for printing or copying operations and can hold several blank sheets of paper at one time. During printing operations, a single blank sheet of paper is passed from rear sheet feeder 38 through the printer mechanism in the conventional fashion.

Located on the right side of sheet feeders 37 and 38 (as viewed from the front of integrated office system 10) is a lever 39. Lever 39 allows a user to manipulate the width of the paper path to accommodate envelopes instead of standard thickness sheets of paper.

Referring now to FIG. 3, when sheets of paper are fed via sheet feeders 37 and 38 through either the scanner or printer mechanisms, the paper emerges through slot 40 located just below front panel 14. To assist in this process, rollers 41 are provided to reduce paper jams. Retractable paper tray 130 is provided to collect the paper as it emerges from slot 40.

Figure 4:
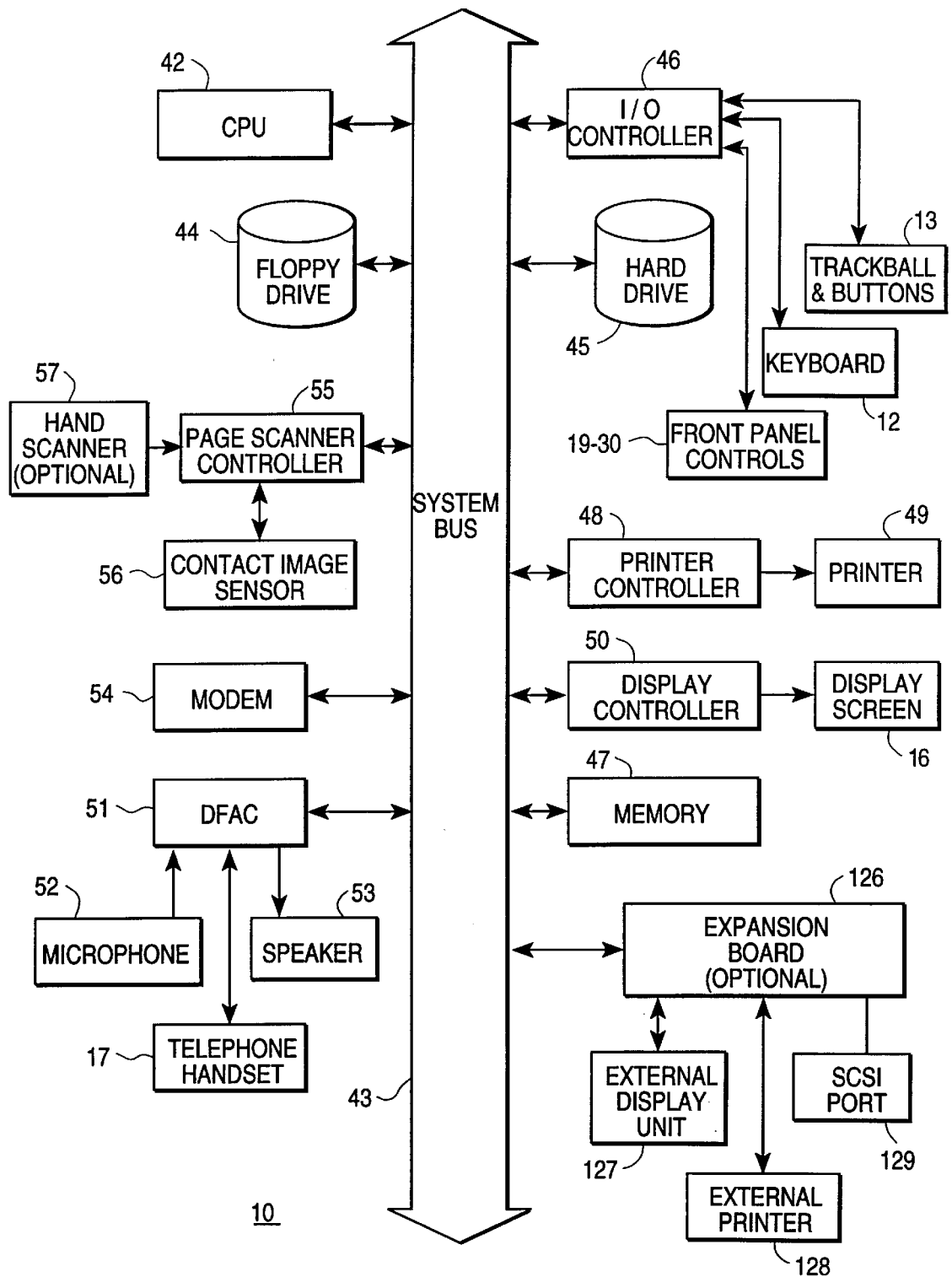
FIG. 4 is a system block diagram of the integrated office system of the present invention.

FIG. 4 is a block diagram of the integrated office system 10. As described above, the system is run by a CPU 42 which is coupled to a system bus 43. Many features familiar to those skilled in the computer arts are present as part of integrated office system 10. These include a floppy disk drive 44, a hard disk drive 45, an I/O controller 46 and main memory 47. Each of these elements communicate with CPU 42 via system bus 43. In this fashion, the personal computer functions of integrated office system 10 can be performed. It will be appreciated that operating system software and other software needed for the operation of integrated office system 10 will be loaded into main memory 47 from either hard disk drive 45 or floppy disk drive 44 upon power up. It will be appreciated that some of the code to be executed by CPU 42 on power up is stored in a ROM.

As further shown in FIG. 4, user control over the features of the integrated office system 10 can be implemented via keyboard 12, cursor control device 13 and front panel controls 19–30. All of these elements are coupled to I/O controller 46, thereby allowing the input and output information to be communicated to and from these devices via system bus 43.

The printer functions of integrated office system 10 are implemented via printer controller 48 and printer 49. Printer controller 48 is coupled to system bus 43, thereby allowing for the transfer of command and data information. Printer 49 is coupled to printer controller 48 in the familiar fashion.

Display controller 50, which typically includes video memory (not shown), is also coupled to system bus 43 and to display screen 16. As is well known in the art, display controller 50 receives command and data information via system bus 43 and then provides the necessary signals to display screen 16, thereby accomplishing the display of text, graphical and other information to the user.

Interface circuitry (DFAC) 51 is coupled to system bus 43 and acts as an interface between telephone handset 17, microphone 52 and speaker 53 and the system bus. In operation, voice signals are converted to electrical signals by either microphone 52 or telephone handset 17. The electrical signals are then digitized by DFAC 51 for further processing, for example, storage as a greeting message to be played when answering telephone calls. When voice mail messages are played back, DFAC 51 provides an interface between system bus 43 and speaker 53.

Modem 54 is coupled to system bus 43 and is used during fax operations in the customary manner.

Page scanner controller 55 is also coupled to system bus 43 and acts as an interface between scanner head 56 and the integrated office system 10. Image data from scanner head 56 is processed by scanner controller 55 and then transmitted via system bus 43 for further processing by CPU 42 and/or storage. Although in a preferred embodiment the scanning operations are carried out using an integrated scanning head 56, other scanning devices such as hand held scanner 57 could be used.

As indicated, an optional expansion board 126 could be provided to allow interconnection with an external display unit 127, an external printer 128 or a SCSI port 129. Using the SCSI port 129, other SCSI compatible devices could be connected to integrated office system 10.

Having thus described the overall integrated office system 10, the description will now turn to the user interface which comprises the present invention.

II. The Workspace and Front Panel Controls

Although the user interface is an important part of any computer system, it takes on special importance in an integrated office system which may be used by a number of persons, each with varying levels of experience. For example, where the integrated office system is installed in a small business, various users may range from those with detailed experience in the operation of computers and other office equipment to new employees with virtually no experience. In a home environment, members of a family will generally each have varying levels of experience with equipment such as facsimile machines and personal computers. To accommodate such a spectrum, the user interface must not be so overwhelming that first-time users are intimidated and it must not be so simplistic that it fails to provide sophisticated users with the power to customize various features. The user interface elements of the present invention accordingly provide first-time and other unsophisticated users with easy to use front panel controls 19–30 and coordinated screen displays. At the same time, experienced users can customize various features using setup displays.

As with personal computer systems known in the art, on power-up a "workspace" 60 is displayed on the screen 16. Other workspaces, such as the "desktop" found in the Macintosh computer systems, are known in the art, however, the workspace 60 of the present invention resembles that shown in FIG. 5. Along the left side of screen 16 are displayed icons 61–64 representing the major features of the integrated office system. In a preferred embodiment, icons labeled "Mail", 61, "Phone", 62, "Fax", 63, and "Copy", 64, are displayed. The icons 61–64 themselves are fanciful graphical representations of the items/features which they represent. For example, the Mail icon 61 might resemble a letter or an envelope, the Phone icon 62 might resemble a telephone handset, etc.

All of the icons 61–64 are implemented using programming techniques well known in the art and it will be apparent that any number of fanciful graphic representations might be used. It will be equally apparent that no icons whatsoever need be used and that mere text descriptions of the features could be listed on the screen. In a preferred embodiment, however, symbols representing the features which the icons represent are chosen so as to provide for ease of operation by novice users.

In prior art computer systems using graphical icons to represent documents or other items of interest, the icons are selected by means of a mouse, or other cursor positioning device. By "selecting" an icon, it is meant that the cursor or pointer is positioned over the icon using the mouse and then a mouse button is pressed and released a specified number of times. Generally, the first press of the mouse button will cause the icon to appear highlighted. The second press of the mouse button, if made within a set period of time, will cause the document or other application to open, i.e., to become active within the workspace.

In the present invention, the icons 61–64 representing the major features of the integrated office system 10 correspond to a group of similarly labeled hardbuttons 20 located on the front panel 14. As shown in FIG. 3, in a preferred embodiment, the hardbuttons 20 are located in a vertical column on the left side of the front panel 14, corresponding to the manner in which the icons 61–64 are displayed on the screen 16. Such an orientation visually associates the hardbuttons 20 with the icons 61–64 and provides for ease of operation. It will be appreciated, however, that other orientations can be used.

Rather than having to use a mouse or a keyboard to select one of the icons 61–64, a user can select one of the icons by pressing a corresponding one of hardbuttons 20, thereby activating that feature of the integrated office system 10. For example, when a user wants to make a phone call, the user presses the hardbutton labeled "Phone" on the front panel 14. Associated with each of the hardbuttons 20 is an LED or other light emitting device (not shown) which lights up when the corresponding hardbutton is pressed.

Figure 5:
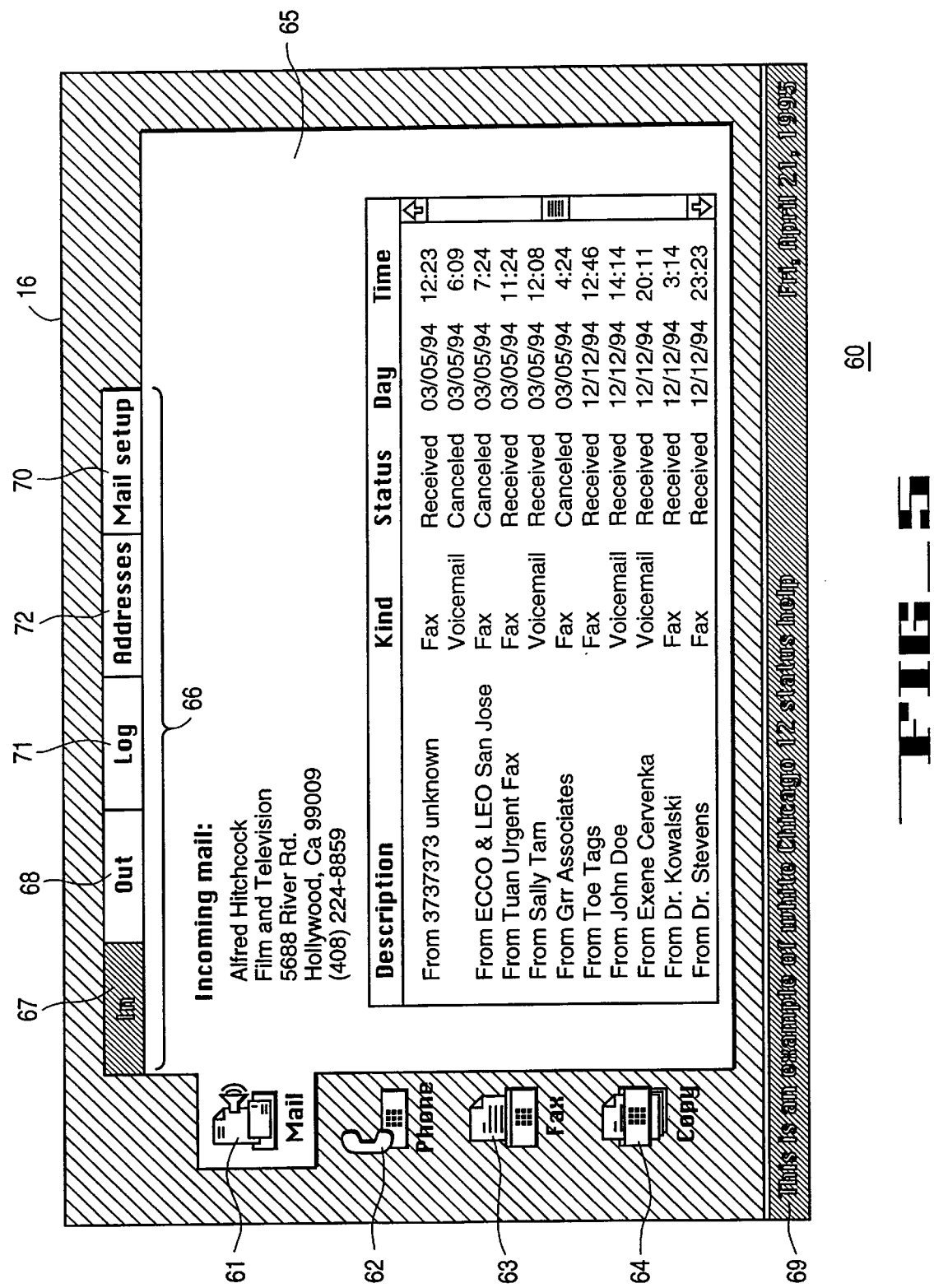
FIG. 5 illustrates the MAIL IN menu of the present invention.

When one of the hardbuttons 20 is pressed, the workspace display 60 changes accordingly and the icon representing the selected feature is highlighted. FIG. 5 shows a typical workspace display 60 which might be seen if the Mail feature is selected. When the user selects the Mail hardbutton 20, the Mail icon 61 is highlighted within the workspace 60. In this manner, a user can select from among the various features of the integrated office system 10 without having to use a mouse, trackball or other device ordinarily associated with a computer. For less experienced users, this represents a relatively simple way to interact with integrated office system 10. Using one of the front panel hardbuttons 20 provides some tactile feedback to a user and reinforces the idea that a particular feature of the system is being selected. For more advanced users, cursor positioning device 13 can be used in the standard fashion to "point and click" when selecting a particular icon.

As can be seen from the Mail example shown in FIG. 5, each of the major features of the integrated office system 10 has a number of options associated with its use. These options are graphically represented to a user via menus 65 displayed within workspace 60. Rather than the "pull down" menus known in the prior art, the menus 65 of the present user interface are displayed as a series of "tabs" 66 at the top of the screen 16. The tabs 66 are given descriptive labels that represent the options with which they are associated. By selecting a corresponding tab, a particular option can be accessed.

In a preferred embodiment, the option menus 65 for each feature of the integrated office system 10 are arranged hierarchically. That is, the menus 65 are arranged such that the most commonly selected option has its tab 66 located at the top, left-most position on the workspace display 60. The next most commonly selected option has its tab 66 positioned to the immediate right of the tab for the most commonly selected option and so on for all of the option menus 65. In all cases, a SETUP tab 66 is displayed such that it is the right-most tab. Each of the elements (Mail, Phone, Fax and Copy) have a setup option or mode which allows the user to customize various aspects of the selected feature, e.g., pulse or tone dialing for the telephone. By making the SETUP tab 66 the right-most tab for all of the various elements, commonality and ease of operation is maintained.

As indicated, a user can select from among the various options of each individual feature by selecting an appropriate tab 66. When the tab 66 is selected, it is highlighted and the menu 65 associated with that option is displayed within the workspace 60. As discussed further below, many of the options of each of the features have various suboptions which can be selected. Just as the icons 61–64 representing the integrated office features could have been selected using a mouse or trackball, so too could the option menus 65 be selected by positioning a cursor or pointer over the associated tab 66 and "clicking". However, as shown in FIG. 3, the user interface of the present invention comprises a novel four-way navigation button 19 which can be used to perform this task.

The navigation button 19 is preferably centrally located on the front panel 14. Once a user has selected a function, e.g., the Mail function, the navigation button 19 is used to select from among the various option menus 65. By pushing on the right or left side of the navigation button 19, the user shifts between the various option menus 65. Each time, the appropriate tab 66 is highlighted. At the same time, the selected option menu 65 is displayed within the workspace 60. In this manner, a user can select the appropriate option without having to resort to the use of a mouse.

For the example illustrated in FIG. 5, it is apparent that a user has selected the Mail feature as represented by highlighted Mail icon 61. The Mail In option has also been selected as is apparent from the highlighted In tab 67 at the top of the workspace 60. Displayed within workspace 60 is Mail In option menu 65. If a user were now to press on the right side of navigation button 19, the In tab would return to its normal non-highlighted state and the Out tab 68 would be highlighted. Within workspace 60, Mail In option menu 65 would be replaced by the Mail Out option menu. Similarly, using the navigation button, a user could select any option menu within the Mail feature. Upon such selection, the associated option tab 66 will be highlighted and the option menu will be displayed within the workspace 60. Like the hardbuttons 20, navigation button 19 provides a user with tactile feedback when an option is selected. Since the options of each feature can be selected using the navigation button, novice users do not have to contend with complex keystroke commands or the use of a trackball and button arrangement.

It will be appreciated that selecting an option using navigation button 19 causes CPU 42 to execute certain instrustions, typically stored in memory 47. In particular, CPU 42 performs the operations necessary to store the current state of the "old" option and recall the last saved state of the "new" option. In addition, the circuitry of the integrated office system 10 will be configured appropriately.

Preferably, the navigation button 19 will incorporate a "wrap around" feature. That is, in order to maintain the hierarchical layout of the option menus, the tabs 66 do not change their relative positions within the workspace 60 as they are selected. Instead, the tabs 66 are either highlighted or not, in response to their selection via the navigation button 19. When the user reaches the right-most tab 66 (which will be the SETUP tab for all features within the preferred embodiment) and a user presses the right side of the navigation button 19, the cursor will "wrap around" to the left-most tab which will then appear highlighted. Similarly, if the cursor is positioned such that the left-most tab is highlighted and the user pushes on the left side of the navigation button 19, the cursor will wrap around to the right most tab on the display 16. In this way ease of operation is maintained and a user can move between options with a minimum of button presses.

As noted above, many of the option menus for each of the integrated office system features will have associated suboptions. These suboptions are displayed within workspace 60 when the parent option is selected. Although these suboptions could be presented in any number of ways (e.g., using icons, in columns, etc.) in a preferred embodiment the suboptions are presented as subrows within the option menu displayed within the workspace 60. In this manner, the suboptions within each option menu can also be selected using the navigation button 19.

As indicated, navigation button 19 is a four-way button. Pushing on the left or right side of the navigation button 19 causes the screen cursor to move sideways, thereby highlighting the option tabs 66 of each office feature and causing the associated option menu 65 to be displayed within the workspace 60. Now, by pushing on the top or bottom of the navigation button 19, a user can move the screen cursor up or down the list of suboptions for each option menu since the suboptions have been arranged vertically on the screen 16. When the cursor is positioned over a suboption, the suboption is highlighted in a similar manner to the tabs 66.

Depending on the office feature and option selected, the types of suboptions available will vary. In some cases, the user may select from a list of names in a "phone book". In other cases, the user will need to use the keyboard to enter the name of a document or specify the number of copies to be printed. There are also situations where a user will need to select or deselect a custom option. In the latter case, the navigation button 19 is used to position the cursor over the custom option to be selected (or deselected) and another button on the front panel 14 (other than the hardbuttons 20 associated with the features of the integrated office system 10) can be pressed to make the custom option active (or to deactivate a previously selected suboption). The various suboptions available within each of the office feature options will be discussed further below. Of course, other methods for selecting suboptions will be apparent to those skilled in the art, for example, the cursor positioning device 13 can always be used.

The navigation button 19, then, allows for Cartesian movement between and within the various option menus associated with each of the features of the integrated office system 10. Through the use of the hardbuttons 20 and the navigation button 19, a user can select a function of the integrated office system 10, e.g., the facsimile communication device, and choose an option, e.g., resend a fax that was garbled during transmission, without having to use the keyboard 12 or trackball 32, items commonly associated with a personal computer and which may be intimidating to an inexperienced user. This Cartesian operation helps make the integrated office system 10 user friendly.

As shown in FIG. 5, in addition to the icons 61–64 representing the features of the integrated office system 10 and the menus associated with their operation, the workspace 60 also includes a message line 69 at the bottom of the screen 16. Preferably, the message line 69 will display the current date and time as well as abbreviated help comments. The help comments provide advice for the user as to what to do next. For example, if a user selects the Fax feature and the Send option menu, the help comment might tell the user to press a particular button to send the fax.

The icons, message line, help comments, option menus and option tabs displayed within the workspace are all implemented using well known programming techniques. In a fashion, the option menu and workspace environment of the integrated office system 10 resemble the windows and desktop environment familiar to users of the Macintosh computer systems. Nevertheless, significant distinctions exist between these two environments, for example, the option tabs of the present invention. Most notably, the use of the hardbuttons 20 and the navigation button 19 to select the features and options of the integrated office system 10 represents a departure from prior user interfaces.

Having thus described the overall workspace and the use of the hardbuttons 20 and the navigation button 19, the specific features of the integrated office system 10 will now be described.

III. The Mail Feature

A user can select the Mail feature by pressing the appropriate hardbutton 20 on the front panel 14 of the main housing 11. As indicated above, the Mail feature can also be selected by positioning the pointer over the Mail icon 61 using the trackball 32 and clicking on the icon. Once the Mail feature has been selected, the various menus associated with the options of this feature are displayed within the workspace 60. As shown in FIG. 5, in a preferred embodiment, options and menus for reviewing incoming mail, reviewing outgoing mail, reviewing an activity log, creating an address book, and mailbox setup are provided. As described above, each menu has its associated tab 66 displayed at the top of the screen 16, arranged left to right from most frequently used to least frequently used, with the MAIL SETUP tab being the right-most on the screen. Only the currently selected option menu will be displayed within the workspace, however, all of the option tabs 66 are displayed.

Using the navigation button 19 in the manner described above, a user selects an option. The first time the Mail feature is selected, and occasionally thereafter, a user will likely want to customize the mailbox features. To accomplish this, the user selects the MAIL SETUP tab 70 using the navigation button 19 or the trackball 32. When the MAIL SETUP tab 70 is selected, the MAIL SETUP menu 73 is displayed in the workspace 60.

Figure 6:
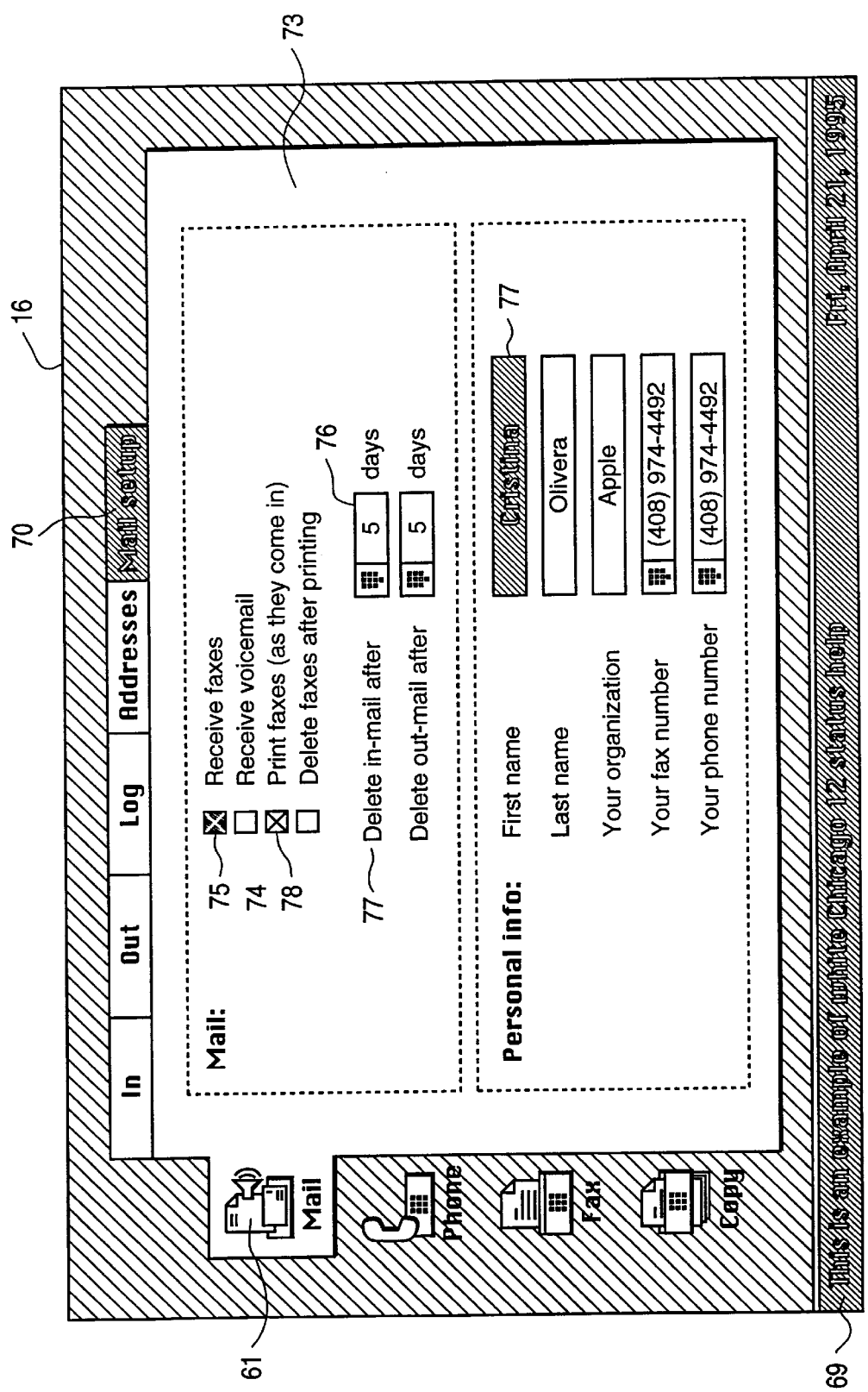
FIG. 6 illustrates the MAIL SETUP menu of the present invention.

As shown in FIG. 6, MAIL SETUP menu 73 contains a number of suboptions which can be selected using the navigation button 19. As is the case for all of the option menus for each of the features of the integrated office system 10, the suboptions are arranged vertically, from the top of the screen 16 to the bottom. This arrangement is permits the use of the navigation button 19 in the manner described above.

Although MAIL SETUP menu 73 might contain any number of suboptions, in a preferred embodiment, suboptions which allow a user to select whether or not to receive faxes, whether or not to receive voice mail, whether or not to print faxes as they are received, and whether to delete faxes after they are printed are included. Because the integrated office system 10 includes a full feature facsimile communication device as well as a digital voice mail system, numerous features associated with such equipments could be made user selectable. For a preferred embodiment, the information to be displayed in the form of a header at the top of transmitted faxes is user selectable. As shown in FIG. 6, a portion of MAIL SETUP menu 73 contains a "personal information" space wherein the user can enter information such as his/her name, organization, and telephone and fax numbers. As is familiar to those who have used facsimile machines of the prior art, when a fax transmission is sent, it is common for header information to be printed at the top of the received document. The header information typically identifies the source of the transmission and may also include the time and date of the transmission. The "personal info" portion of MAIL SETUP menu 73 allows a user to provide for such header information.

As with all of the option menus for the features of integrated office system 10, MAIL SETUP menu 73 allows a user to select from among various suboptions using graphically displayed decision boxes 74, well known in the art. Such decision boxes allow a user to select a feature by placing an "X" in the box. If no "X" is placed in the box, the feature is not selected. FIG. 6 shows four such decision boxes 74. One of these decision boxes, 75, is highlighted, as would be the case if the navigation button 19 were used to position the screen cursor in this position. Such is accomplished, as described above, by pressing on the top or bottom portion of navigation button 19 until the screen cursor is positioned over decision box 75. With the cursor so positioned, the suboption represented by decision box 75 can be selected (or deselected) using a separate button located on the front panel 14.

In the example shown in FIG. 6, the feature "Receive faxes" has been selected as indicated by the "X" in decision box 75. This selection is accomplished by pressing the "Start" button 22 on the front panel 14. When Start button 22 is pressed, an "X" appears in decision box 75 and the software running on integrated office system 10 configures the circuitry associated with the facsimile communication device, including modem 54, to receive facsimile transmissions. Alternatively, if the user wants to deselect the "Receive faxes" suboption, once the cursor has be positioned over decision box 75 using navigation button 19, "Stop" button 23 is pressed and the "X" is removed from decision box 75. At the same time, the software running on integrated office system 10 configures the circuitry associated with the facsimile communications device so that no faxes are received. It will be appreciated that the presence of an "X" in decision box 75 is a feature of the user interface of the present invention and is a graphical representation which allows a user to tell at a glance whether the circuitry of the integrated office system 10 has been configured so as to accept incoming facsimile transmissions.

In a preferred embodiment, Start and Stop buttons, 22 and 23, are similar in appearance to the hardbuttons 20 used to select among the major features of the integrated office system 10, with the exception that Start button 22 is green in color and Stop button 23 is red in color, to distinguish these buttons. Start and Stop buttons 22 and 23 are preferably located next to the navigation button 19 on the front panel 14. It will be appreciated that the labels "Start" and "Stop" are not critical and other labels such as "Select" and "Deselect" could be used. Indeed, no labels need be present at all, however, if no labels are provided, a novice user may be unable to determine which button to press to perform a given function.

It will be apparent to those skilled in the art that other methods of selecting these various suboptions can be implemented. For example, trackball 32 could be used to position a pointer over decision box 75. The suboption represented by decision box 75 could then be selected by double clicking the trackball button 33 or 34. Such a method of selecting suboptions would be familiar to those users with some computer experience. However, the advantage of allowing a selection to be made using only the front panel controls (including navigation button 19) is that users who are unfamiliar with the use of a trackball or a mouse can still perform the relatively complex task of customizing a mailbox.

As is apparent from the example shown in FIG. 6, other types of suboptions require different types of input. For example, the suboption "Delete In Mail" 77 requires a user to specify when (in terms of the number of days after reception) the mail should be deleted. This suboption is customized by first selecting it using navigation button 19 in the fashion described above. When selected, the suboption 77 will be highlighted and a user will be able to input the number of days until mail is deleted from the system. As will be apparent to those skilled in the art, as the term "mail" is being used in this description, it refers to "electronic mail" and not the letters and other materials sent and delivered via the postal service. Electronic mail is generally stored as a file on the system hard disk 45 or memory 47 as it is received. Of course other storage media, such as floppy disks, could be used.

Stored messages take up space within hard disk 45, memory or other storage media and thus should preferably be deleted when no longer needed. In this way, hard disk 45 is not soon filled to capacity by old messages. To accommodate this, the "Delete In Mail" suboption 77 is provided.

To specify the number of days after which incoming mail should be deleted, the user selects the suboption 77 as described above. Then, the appropriate data can be entered in data box 76 using keyboard 12. Alternatively, since only a number is required, the appropriate data can be entered using keypad 21 on front panel 14. Keypad 21 is a standard telephone keypad, familiar to all users of touch tone phones. By simply pressing the appropriate number on the keypad, e.g., "5", the data is entered in data box 76. Once such data is entered, the software running on integrate office system 10 configures the system to delete incoming messages after the specified length of time. Of course, it will be apparent to those skilled in the art that many other methods for eliminating unwanted messages could be implemented. For example, the user could have the option of deleting or resaving a message after it is played (in the case of a voice message) or viewed (in the case of a fax message).

Yet another type of suboption is illustrated in FIG. 6. As discussed above, the user may wish to generate a header for outgoing faxes. To accommodate this, MAIL SETUP menu 73 has a "personal info" section. The various suboptions which make up this section are selected using the navigation button 19 as described above. Each of these suboptions has an associated text box, e.g., text box 77. The user can type in the requested information using keyboard 12 when the appropriate suboption text box is highlighted. Once the information has been input, the software running on integrated office system 10 stores the information on hard disk 45 for future use. When a fax is transmitted, the information is recalled and provided to modem 34 for transmission along with the other data being sent. In this manner, the integrated office system is customized to the user's needs and preferences.

As the navigation button 19 is used to move the cursor between the various suboptions within the MAIL SETUP menu 73, help messages are displayed within the message line 69 at the bottom of the workspace 60. The help message is designed to answer the most common user questions or to act as a reminder for the user regarding what to do next. For example, having selected the Mail feature using the front panel hardbutton 20 and the MAIL SETUP menu 73 using the left-right motion of the navigation button 19, a user might use the up-down motion of the navigation button 19 to place the cursor over the PRINT FAXES decision box 78. In response, the help message displayed in message line 69 might read, "Press START to Select". This short message reminds a user that the feature represented by the PRINT FAXES suboption can be selected by pressing the Start button 22 located on the front panel 14. This integrated help portion of the user interface further allows for ease of use by unsophisticated users.

The help message displayed in message line 69 is prestored on hard drive 45 as part of the integrated office system software. During operation, the system software, including the help mesage, is loaded into memory 47. In response to user commands accessing the suboption, the help message is retrieved and displayed using techniques well known in the art. Similar help messages are displayed for other selected suboptions.

Figure 7:
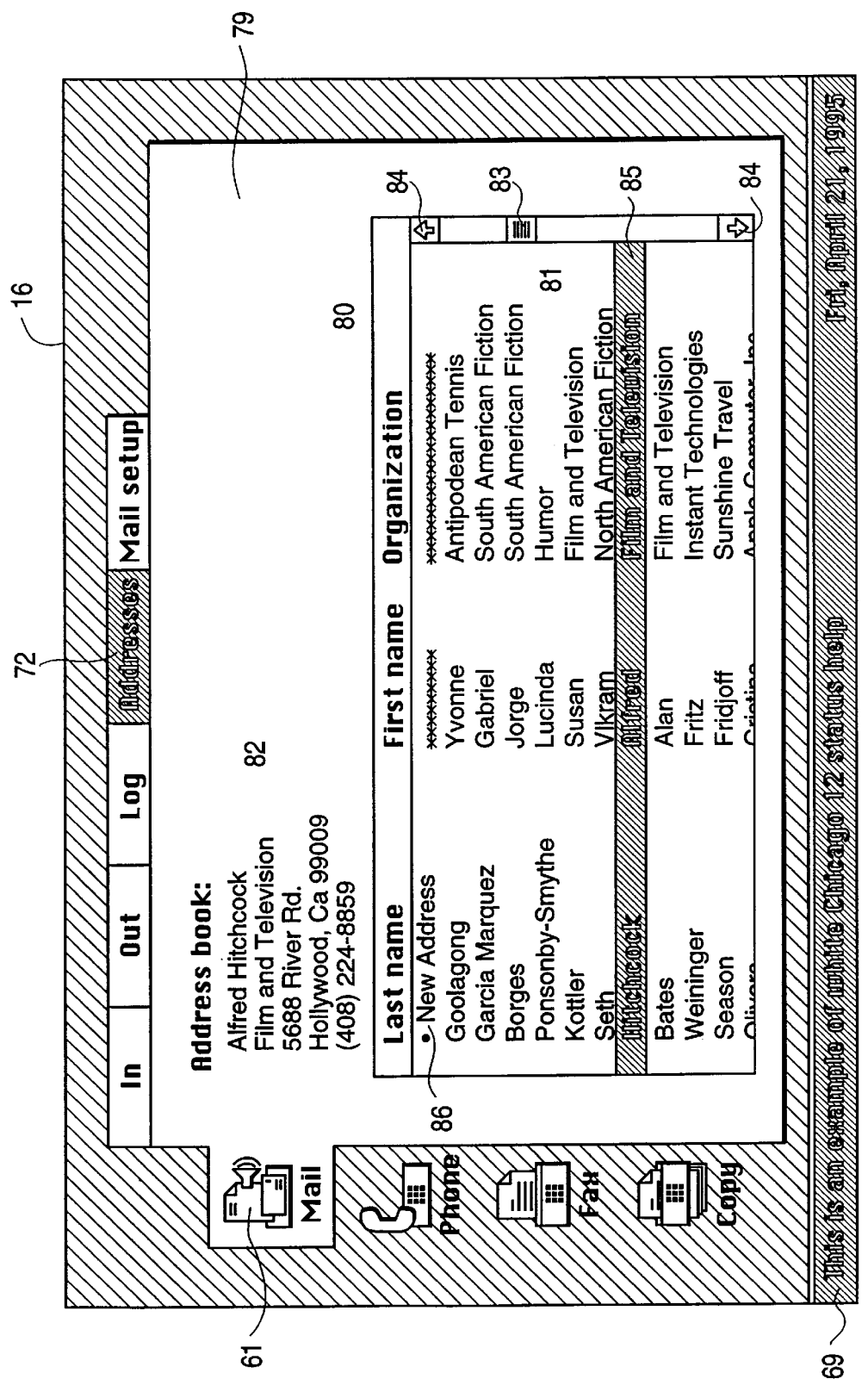
FIG. 7 illustrates the address book of the present invention.

Another option within the Mail feature is the ADDRESS option. Like all other options, the ADDRESS option, and its associated menu 79, is selected using the navigation button 19 to highlight the ADDRESS tab 72 as shown in FIG. 7. When the ADDRESS tab 72 is selected, address book 80 is displayed in ADDRESS menu 79. The address book 80 is displayed as a summary and may include the name (first and last) of the individual whose address is stored and the individual's organization or other identifying information.

Just as if moving between suboptions within a menu, by pressing up or down on the navigation button 19, a user may browse through the entries in the address book 80. As with all suboptions, when the user pushes the bottom of the navigation button 19, the cursor moves down the list of names within the address book 80, highlighting each entry in turn. For the example shown in FIG. 7, "A. Hitchcock" has been selected and is highlighted. As each entry is "selected" in this manner using the navigation button 19, the complete entry is displayed within workspace 60 in an address field 82. The Hitchcock example is shown in FIG. 7. The complete entry includes information contained in the summary, such as the addressee's name and organization, and also gives a complete address, telephone number and other identifying or miscellaneous information. In this fashion, a user can scan through the address book 80 using only the navigation button 19.

It will be apparent to those skilled in the art that address book 80 could also be scanned using cursor positioning device 13. The address book 80 is displayed in a familiar dialog box format within workspace 60. This is accomplished using well known programming techniques. Using the cursor positioning device 13 to point the cursor at scroll bar 83 and then dragging the scroll bar 83 in the customary fashion, all of the entries in the address book 80 can be searched. Alternatively, the search can be done using the scroll arrows 84 in the typical fashion. However, the ability to use the navigation button 19 to scroll through the entries in address book 80 allows for users completely unfamiliar with dialog boxes and scroll bars to quickly move though the address book entries. The navigation button 19 thus bridges the gap for less experienced users since scrolling through the address book 80 is made identical to the selection of suboptions. Indeed, each of the address book entries can be thought of as a suboption.

The ADDRESS menu 79 also provides for entry of new addressee information. In a preferred embodiment, the top line of address book 80 is a "new address" field 86. As with all suboptions, the user selects the "new address" field 86 by positioning the cursor using the up/down motion of the navigation button 19 and then pressing the "select" button (i.e., the Start button 22) on the front panel 14. Of course, the "new address" field 86 could also be selected using trackball 32 to position a pointer and then double clicking one of trackball buttons 33 or 34.

When the new address field 86 is selected, a new submenu opens. The submenu provides an area for the user to enter the new addressee information in text boxes similar to text box 66 shown in FIG. 6. This information will typically include the addressee's name, organization, telephone number, fax number and address. There are sufficient text boxes to provide all of this information and the user moves between text boxes using the navigation button 19 as though selecting suboptions. Of course, this could also be accomplished using the tab key of keyboard 12 or some other well known technique for moving between such fields.

The addressee information is entered using the keyboard 12. In a preferred embodiment the submenu contains prompts which assist the user in entering this data. The prompts are clues like "Name:", "Organization:", etc., which direct the user to enter specific information in various text boxes that make up the new address submenu. These entries are stored in the nonvolatile memory of the integrated office system 10 using storage techniques well known in the art.

When the user has completed entering the new addressee information the user leaves the new address submenu by pressing the Stop button 23 on front panel 14. Thus, the same interface controls, i.e., navigation button 19, Start button 22 and Stop button 23 which are used when selecting suboptions, are used to assist the user in entering new addressee information. In this way, even novice users are made to feel comfortable while performing this task.

The address book 80 is used by several other features of the integrated office system 10. For example, if a user wishes to send a fax to one of the previously stored addressees, the user can select the fax icon 63 using the appropriate front panel hardbutton 20, and then use the navigation button 19 to select the proper addressee from a "SEND" menu which resembles address book 80. All of the addressees which were entered in the address book 80 under the ADDRESS menu 79 of the Mail feature will be available in all of the other menus of the other integrated office system 10 features which require addressee information. In addition, new addressees can be entered in a manner similar to that described above from any menu of any feature which displays address book 80. By maintaining a linked address book for all of the features of the integrated office system 10, a user is spared the task of storing identical addressee information multiple times.

New information, such as a new telephone number, for existing addressees can be easily saved by editing the addressee's address book entry. In a preferred embodiment, a user would use the navigation button 19 to highlight the addressee whose information needs to be amended. Then, the user presses the Start button 22 on the front panel 14, which causes the address submenu to open. Using the navigation button 19, the user can select the field which requires editing. The field is made active by again pressing the Start button 22 on the front panel 14. New information is entered and old information deleted using the keyboard 12 in the customary fashion. When finished, the Stop button 23 on the front panel 14 is pressed and the address submenu disappears from the screen. The updated address book entry is stored and can be used as described above.

An address book entry can be deleted by highlighting the summary entry in address book 80 using the navigation button 19 and pressing a delete button 24 on the front panel 14 of the integrated office system 10. Preferably, a delete operation of this type will require confirmation. For example, in a preferred embodiment, when delete button 24 is pressed, a warning message appears on screen 16 asking the user if he/she really wants to delete the selected entry. To confirm deletion, the user is instructed to press the Start button 22. If deletion is not what the user intended, he/she is instructed to press the Stop button 23, thereby canceling deletion of the selected addressee entry. In a preferred embodiment, address book entries may be deleted or edited from any menu of any feature in which the address book 80 is displayed.

As the navigation button 19 is used to move the cursor between the various entries in the address book 80, help messages are displayed within the message line 69 at the bottom of the workspace 60. The help message is designed to assist the user, for example, through the use of phrases such as "Press START to Select". This short message reminds a user that by pressing the START button 22 on the front panel 14, the highlighted addressee is selected (for editing, etc.).

Other options within the Mail feature of a preferred embodiment include a summary of incoming mail (voice and fax), a summary of outgoing mail (i.e., fax transmissions and telephone calls), and a combined summary of all incoming and outgoing mail. It will be apparent that the present invention can be implemented with additional options or with fewer options. Each of the options have associated menus and are selected using the navigation button as described above.

The incoming mail option provides a menu that lists all incoming faxes and voice mail messages. The individual entries within the menu are selected using the navigation button 19 as if they were suboptions. A highlighted entry is selected by pressing the Start 22 button on the front panel 14. In the case of an incoming fax, selecting the entry in this fashion will cause the fax document to be displayed within the workspace for the user to read. In the case of a voice mail message, selecting the entry will cause the message to be played through the front panel speaker 53 or handset 17 for the user to hear.

Incoming mail can be deleted from this menu by selecting the appropriate entry using the navigation button 19 and pressing the delete button 24. Again when delete button 24 is pressed, a warning message appears on screen 16 asking the user if he/she really wants to delete the selected entry. To confirm deletion, the user is instructed to press the Start button 22. If deletion is not what the user intended, he/she is instructed to press the Stop button 23, thereby canceling deletion of the selected entry.

Outgoing mail can be reviewed and deleted in a similar fashion from the Mail Out menu. In one embodiment of the present invention, the Mail Out menu resembles the Mail In menu 65 shown in FIG. 5, with the exception that a summary of outgoing messages is displayed.

Both incoming and outgoing mail can be reviewed and deleted in a similar fashion from the Mail Log menu. In one embodiment, the Mail Log menu displays a record of all incoming and outgoing mail in a fashion similar to that shown for the Mail In menu 65 in FIG. 5.

IV. The Phone Feature

Figure 8:
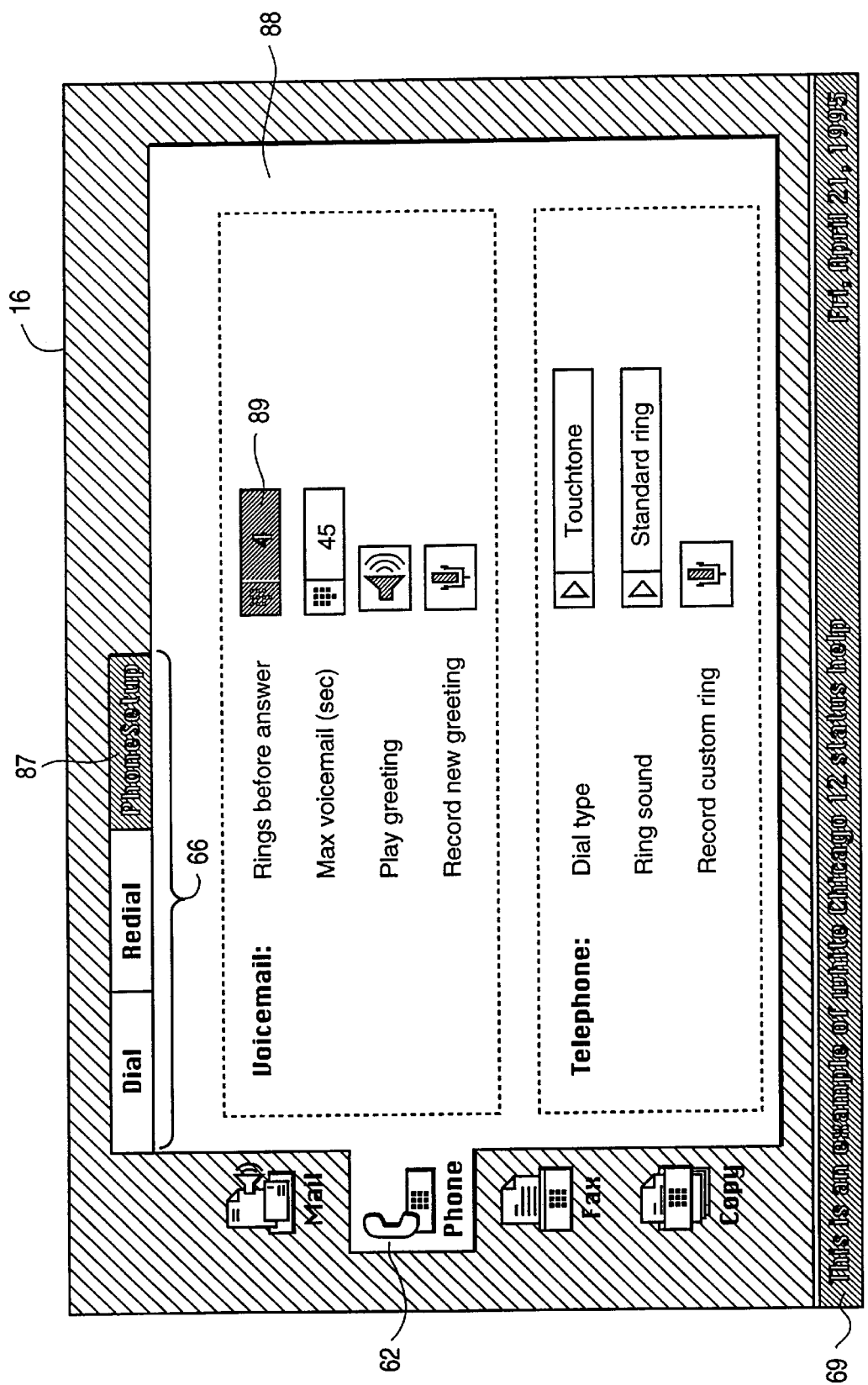
FIG. 8 illustrates the PHONE SETUP menu of the present invention.

A user can select the Phone feature by pressing the appropriate hardbutton 20 on the front panel 14 of the main housing 11. As indicated above, the Phone feature can also be selected by positioning the pointer over the Phone icon 62 (shown in FIG. 8) using the trackball 32 and clicking on the icon. Once the Phone feature has been selected, the various menus associated with the options of this feature are displayed within the workspace 60. As shown in FIG. 8, in a preferred embodiment, options and menus for dialing outgoing calls, redialing outgoing calls, and phone setup are provided. As described above, each menu has its associated tab 66 displayed at the top of the screen 16, arranged left to right from most frequently used to least frequently used, with the PHONE SETUP tab 87 being the right-most on the screen 16. Only the currently selected option menu will be displayed within the workspace, however, all of the option tabs 66 are displayed.

Using the navigation button 19 in the manner described above, a user selects an option. The first time the Phone feature is selected, and occasionally thereafter, a user will likely want to customize the phone features. To accomplish this, the user selects the PHONE SETUP tab 87 using the navigation button 19 or the trackball 32. When the PHONE SETUP tab 87 is selected, the PHONE SETUP menu 88 is displayed in the workspace 60.

As shown in FIG. 8, PHONE SETUP menu 88 contains a number of suboptions which can be selected using the navigation button 19. As is the case for all of the option menus for each of the features of the integrated office system 10, the suboptions are arranged vertically, from the top of the screen 16 to the bottom. It will be appreciated that, as is the case for all of the suboption displays for all of the features of integrated office system 10, the suboptions represent capabilities of the system. When a suboption is selected, the circuitry of the system is configured accordingly. In this manner, the menus and suboptions act as graphical user interfaces, allowing a user to interact with the integrated office system.

Although PHONE SETUP menu 88 might contain any number of suboptions, in a preferred embodiment, suboptions which allow a user to customize the voice mail functions of integrated office system 10 are provided. These include suboptions to select the number of rings before the voice mail logic answers the incoming call, and the maximum length of time allowed for a single message. Users are also presented with suboptions allowing them to listen to the recorded greeting that will be played when the voice mail logic answers a call and with suboptions allowing them to record a new greeting. As shown in FIG. 8, PHONE SETUP menu 88 also displays suboptions allowing customization of the phone features. These include the dial type (typically pulse or tone) and the ring sound (prerecorded or custom). In the case of a custom ring, the user is able to select a suboption which allows the custom ring sound to be recorded. It will be apparent to those skilled in the art that other customization suboptions could be provided.

As with all of the option menus for the features of integrated office system 10, PHONE SETUP menu 88 allows a user to select from among various suboptions using graphically displayed decision boxes, text boxes, etc. All of these items are well known in the art and are implemented using well known programming techniques. User selection and data entry is accomplished in a manner similar to that described with reference to the Mail Feature above. It will be appreciated that the user input in the PHONE SETUP menu will result in the circuitry of the integrated office system 10 being configured so as to conform to these instructions.

It will be further appreciated that voice messages received by integrated office system 10 will generally be stored as files on the system hard disk 45 or in memory 47 as they are received. Of course, other storage media, such as floppy disks, could be used. Similarly, the greetings to be played when the voice mail logic answers an incoming call are stored on the hard disk 45 as files. When an incoming call is answered by the integrated office system 10, the greeting message is retrieved by CPU 42 from hard disk 45 and played back for the caller to hear using the voice mail logic. At the end of the greeting, an audio tone sounds to alert the caller that the message is being recorded. Thereafter, the incoming message is received and digitized by the voice mail logic and the digitized message is saved as a file on hard disk 45 for later playback.

As the navigation button 19 is used to move the cursor between the various suboptions within the PHONE SETUP menu 88, help messages are displayed within the message line 69 at the bottom of the workspace 60. The help message is designed to answer the most common user questions or to act as a reminder for the user regarding what to do next. For example, having selected the Phone feature using the front panel hardbutton 20 and the PHONE SETUP menu 88 using the left-right motion of the navigation button 19, a user might use the up-down motion of the navigation button 19 to place the cursor over the RINGS BEFORE ANSWER text box 89. In response, the help message displayed in message line 69 might read, "Enter number of rings allowed before auto-answer". This short message reminds a user that the feature represented by the RINGS BEFORE ANSWER suboption can be modified by entering a new number of rings from the keyboard 12 or the telephone keypad 21. This integrated help portion of the user interface further allows for ease of use by unsophisticated users.

Figure 9:
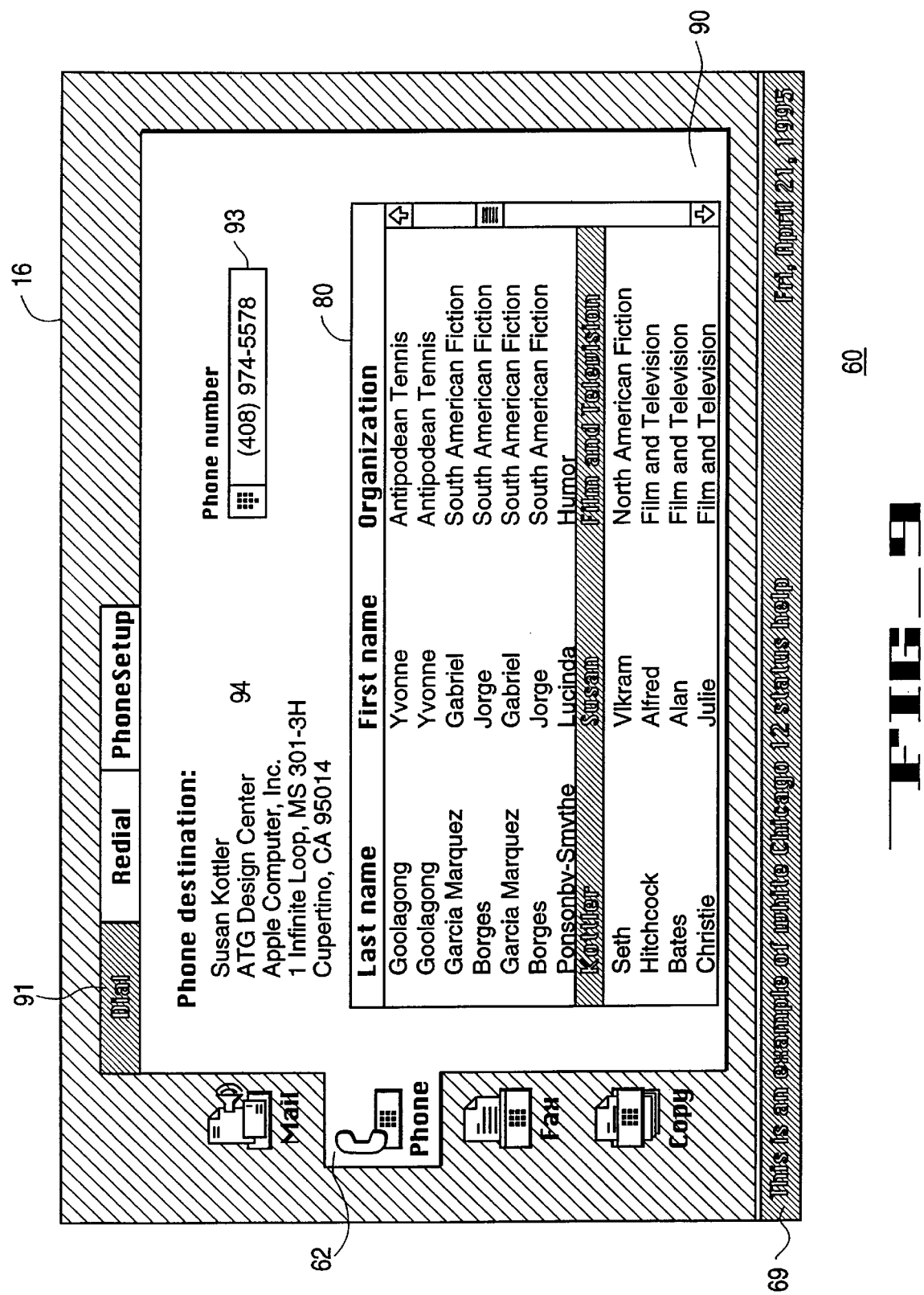
FIG. 9 illustrates the DIAL menu of the present invention.

Another option within the Mail feature is the DIAL option. Like all other options, the DIAL option and its associated menu 90 is selected using the navigation button 19 to highlight the DIAL tab 91, as shown in FIG. 9. When the DIAL tab 91 is selected, address book 80 is displayed in DIAL menu 90. As was the case for the Mail feature above, the address book 80 is displayed as a summary and may include the name (first and last) of the individual whose address is stored and the individual's organization or other identifying information. It will be recognized by those skilled in the art that address book 80 is a linked database, accessible by various features and options of integrated office system 10.

Addressees (or callees) are selected in a manner similar to that described above using navigation button 19 or cursor pointing device 13. For the example shown in FIG. 9, "Susan Kottler" has been selected and is highlighted. As each entry is "selected" in this manner, the complete entry is displayed within workspace 60 in an address field 94. The Kottler example is shown in FIG. 9. The complete entry includes information contained in the summary, such as the addressee's name and organization, and also gives a complete address, telephone number and other identifying or miscellaneous information. Address book 80 is scanned by a user in the manner discussed above.

The DIAL menu 90 also provides a "phone number" field 93. When an addressee is selected from address book 80, the phone number associated with the addressee automatically appears in phone number field 93. For a preferred embodiment, a user can automatically dial this number by pressing Start button 22 on front panel 14. When the call has been completed, the user can disconnect the call by pressing Stop button 23. Of course, other methods of initiating and terminating a phone call could be implemented. During the call, the user could use handset 17 in the traditional manner. "Speakerphone" operation using speaker 53 and microphone 52 is also possible.

In the event that a user wishes to place a call to a telephone number not associated with an addressee contained in address book 80, the user simply enters the phone number to be dialed while in the Dial option. As the new phone number is entered, it is displayed within phone number field 93. The phone number is entered either using telephone keypad 21 on front panel 14 or using the number keys on keyboard 12.

Address book 80 contains a new address field substantially identical to new address field 86 shown in FIG. 7. By selecting this field, a user can enter new addressee information in a manner similar to that described above.

In the above description, it was indicated that the Phone feature could be selected using either the appropriate hardbutton 20 or the cursor positioning device 32. In a preferred embodiment, the Phone feature is also automatically accessed whenever handset 17 is lifted off handset rest 18. Any time the user wishes to place a telephone call, the user can simply take handset 17 off-hook and dial a telephone number using keypad 21. When the handset 17 is taken off-hook, DIAL menu 90 is automatically displayed in workspace 60. Hence, address book 80 becomes available and the user can dial a prestored number by selecting an addressee as described above and pressing Start button 22. Sometimes a user will want to use the speakerphone function instead of handset 17. In a manner similar to that described for handset 17, when speakerphone button 28 (see FIG. 3) is activated, DIAL menu 90 is automatically displayed in workspace 60 and the user can place a telephone call.

The telephone logic of integrated office system 10 includes, in one embodiment, a hold feature. This is accessed in the customary manner using Hold button 29 on front panel 14 (see FIG. 3). When a call is placed on hold, a user can speak to someone else in the room, for example, without the other party to the call overhearing the conversation. A volume switch 30 is also provided. Using volume switch 30, a user can raise or lower the level of the sound being relayed through handset 17 or speaker 53.

Other options within the Phone feature of a preferred embodiment include a redial option with an associated menu (not shown). The redial option allows a user to review a log of calls made. The log appears similar to that used to show incoming and outgoing mail and shows the number dialed, and the date and time of the call. The individual entries within the menu are selected using the navigation button 19 as if they were suboptions. To redial a number, a user can select a particular entry using the navigation button 19, or other means, and then press Start button 22. The number will be redialed.

V. The Facsimile Feature

Figure 10:
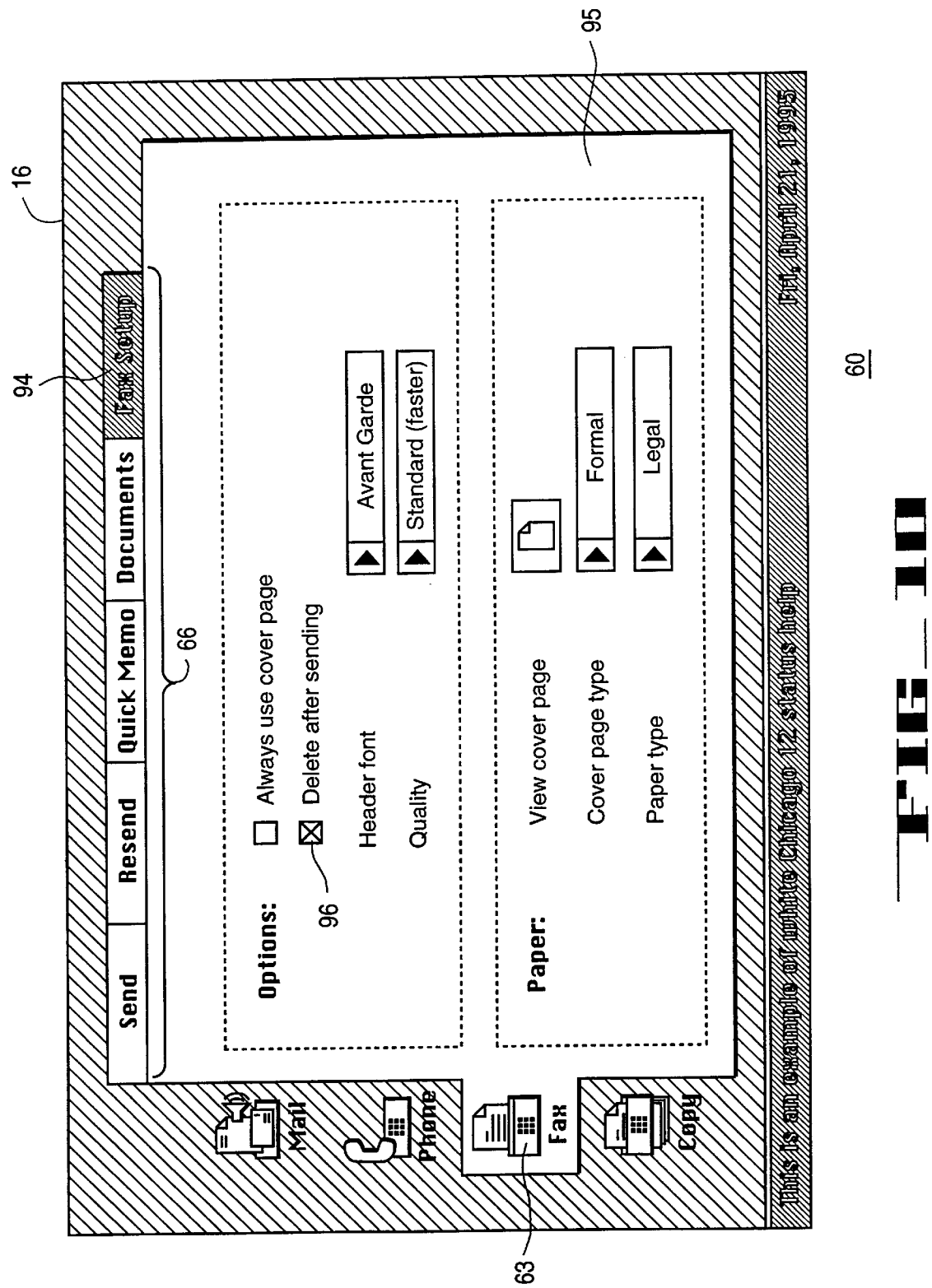
FIG. 10 illustrates the FAX SETUP menu of the present invention.

A user can select the Facsimile (or Fax) feature by pressing the appropriate hardbutton 20 on the front panel 14 of the main housing 11. As indicated above, the Fax feature can also be selected by positioning the pointer over the Fax icon 62 (shown in FIG. 10) using the trackball 32 and clicking on the icon. Once the Fax feature has been selected, the various menus associated with the options of this feature are displayed within the workspace 60. As shown in FIG. 10, in a preferred embodiment, options and menus for sending outgoing faxes, resending outgoing faxes, generating "quick memos", reviewing received documents and fax setup are provided. As described above, each menu has its associated tab 66 displayed at the top of the screen 16, arranged left to right from most frequently used to least frequently used, with the FAX SETUP tab 94 being the right-most on the screen 16. Only the currently selected option menu will be displayed within the workspace, however, all of the option tabs 66 are displayed.

Using the navigation button 19 in the manner described above, a user selects an option. The first time the Fax feature is selected, and occasionally thereafter, a user will likely want to customize the fax features. To accomplish this, the user selects the FAX SETUP tab 94 using the navigation button 19 or the trackball 32. When the FAX SETUP tab 94 is selected, the FAX SETUP menu 95 is displayed in the workspace 60.

As shown in FIG. 10, FAX SETUP menu 95 contains a number of suboptions which can be selected using the navigation button 19. As is the case for all of the option menus for each of the features of the integrated office system 10, the suboptions are arranged vertically, from the top of the screen 16 to the bottom.

Although FAX SETUP menu 94 might contain any number of suboptions, in a preferred embodiment, suboptions which allow a user to customize the fax functions of integrated office system 10 are provided. These include suboptions to select whether or not to always use a cover page on outgoing faxes, whether to delete outgoing faxes from system memory after sending, the type of header font to use, and the quality of document transmission. Users are also presented with suboptions allowing them to review and change the cover page and with suboptions allowing them to select the paper type. Of course, other customization suboptions could be made user selectable.

As with all of the option menus for the features of integrated office system 10, FAX SETUP menu 95 allows a user to select from among various suboptions using graphically displayed decision boxes, text boxes, etc. All of these items are well known in the art and are implemented using well known programming techniques. User selection and data entry is accomplished in a manner similar to that described with reference to the Mail Feature above. It is understood that the user input in the FAX SETUP menu 95 will result in the circuitry of the integrated office system 10 being configured so as to conform to these instructions.

It will be appreciated by those skilled in the art that outgoing faxes may be one of two types. Electronic faxes will generally consist of computer generated documents, created say using a standard word processing application program running on the computer portion of integrated office system 10. Such documents will be stored in memory 47 or may exist as a file on hard drive 45. Alternatively, the electronic document may exist as a file on a floppy disk which has been inserted into floppy drive 44. Whatever its origin, the electronic document can be faxed using the modem 54 in the conventional manner. No paper copy is necessary. In other circumstances, a user will have a paper document which he or she wishes to transmit by fax. In that case, the document is fed into the scanning portion of integrated office system 10 through sheet feeder 37. The document is fed through the scanner apparatus and is scanned by contact image sensor 56. The optical information is digitized using conventional techniques and the now electronic document is transmitted via modem 54 as a fax transmission.

It will be further appreciated that fax messages received by integrated office system 10 will generally be stored as files on the system hard disk 45 as they are received. Of course, other storage media, such as floppy disks, could be used, or the fax transmissions could be stored in system memory 47.

As the navigation button 19 is used to move the cursor between the various suboptions within the FAX SETUP menu 95, help messages are displayed within the message line 69 at the bottom of the workspace 60. The help message is designed to answer the most common user questions or to act as a reminder for the user regarding what to do next. For example, having selected the Fax feature using the front panel hardbutton 20 and the FAX SETUP menu 95 using the left-right motion of the navigation button 19, a user might use the up-down motion of the navigation button 19 to place the cursor over the DELETE AFTER SENDING decision box 96. To then select this suboption, the user presses the "Start" button 22 on the front panel 14. When Start button 22 is pressed, an "X" appears in decision box 96 and the software running on integrated office system 10 configures the circuitry associated with the facsimile communication device to delete facsimile transmissions after they are sent. Alternatively, if the user wants to deselect this suboption, once the cursor has be positioned over decision box 96 using navigation button 19, "Stop" button 23 is pressed and the "X" is removed from decision box 96. At the same time, the software running on integrated office system 10 configures the circuitry associated with the facsimile communications device so that no faxes are deleted upon transmission. It will be appreciated that the presence of an "X" in decision box 96 is a feature of the user interface of the present invention and is a graphical representation which allows a user to tell at a glance whether the circuitry of the integrated office system 10 has been configured so as to delete outgoing facsimile transmissions after they are sent.

Another option within the Fax feature is the SEND option, discussed with reference to FIG. 11. As will be apparent, the SEND option is activated when a user wants to send a paper document by facsimile transmission to a remote site. Like all other options, the SEND option and its associated menu 98 is selected using the navigation button 19 to highlight the SEND tab 97, as shown in FIG. 11. When the SEND tab 97 is initially selected, address book 80 (not shown in FIG. 11) is displayed in DIAL menu 90. As was the case for the Mail feature above, the address book 80 is displayed as a summary and may include the name (first and last) of the individual whose address is stored and the individual's organization or other identifying information.

An addressee is selected in a manner similar to that described above using navigation button 19 or cursor control device 13. As each entry is "selected" in this manner, the complete entry is displayed within workspace 60 in an address field 100. The Kottler example is shown in FIG. 11. The complete entry includes information contained in the summary, such as the addressee's name and organization, and also gives a complete address, telephone number and other identifying or miscellaneous information. Address book 80 is used in the manner discussed above. Also displayed at this point is a decision box that allows a user to specify whether a cover page is to be used. This decision box can be selected in a manner similar to that discussed above for other decision boxes. If the user has previously setup the fax to always use a cover page, this suboption is automatically selected when the user enters the SEND option.

The SEND menu 98 also provides a "fax number" field 101. When an addressee is selected from address book 80, the fax number associated with the addressee automatically appears in fax number field 101. For a preferred embodiment, a user can automatically dial this number by pressing Start button 22 on front panel 14. Of course, other methods of initiating the call could be implemented. If the user has chosen to use a cover page, the user can now enter a subject message for the fax. Subject field 102 is displayed in SEND menu 98, as shown in FIG. 11, and any text entered by the user in this field will appear in the subject line of the fax cover page at the receiver. If no cover page was selected, this suboption will not be activated.

In the event that a user wishes to place a call to a telephone number not associated with an addressee contained in address book 80, the user simply enters the phone number to be dialed in fax number field 101. This is accomplished by manipulating navigation button 19 to highlight the field and then typing in the phone number using telephone keypad 21 or keyboard 12. As the new phone number is entered, it is displayed within fax number field 101.

Address book 80 contains a new address field substantially identical to new address field 86 shown in FIG. 7. By selecting this field, a user can enter new addressee information in a manner similar to that described above.

Once the appropriate fax number appears in fax number field 101, the user can initiate transmission by pressing the Start button 22. At this point, the user will see an illustration 99, displayed within the workspace 60. The illustration, in a preferred embodiment, depicts integrated office system 10 and includes an animated sheet of paper 103. The sheet of paper 103 moves on screen 16 so as to give the appearance of being inserted into paper tray 37. This illustration 99, which is implemented using conventional programming techniques, is designed to alert the user that the document is to be faxed must now be inserted so that it can be scanned as described above. As the document is fed through the scanner mechanism and across contact image sensor 56, the optical information is digitized under the control of scanner controller 55. This digitized information is then transmitted to the receiving fax machine via modem 54 in the conventional manner. As the document passes through the scanner mechanism, it emerges through slot 40, underneath front panel 14 (see FIG. 3). Rollers 41 are provided to accommodate this operation and prevent paper path jams. The paper is collected on retractable paper tray 130 as it emerges from slot 40.

As indicated in FIG. 11, the Fax feature also supports a RESEND option with an associated RESEND tab 104. When the RESEND option is selected in a manner similar to that described above, the user is presented with a list of past fax transmissions. This is similar to the list of past telephone calls displayed within workspace 60 when the REDIAL option for the Phone feature is selected. By selecting one of the entries of the RESEND option, a user can retransmit a fax that may have been corrupted during the original transmission.

Referring now to FIG. 12, another option within the Fax feature is the QUICK MEMO option. Associated with this option is QUICK MEMO tab 105. When QUICK MEMO tab 105 is selected using navigation button 19 or other manner, QUICK MEMO tab 105 becomes highlighted and QUICK MEMO menu 107 is displayed within workspace 60. Using the QUICK MEMO option, a user can send a brief memo or note via a facsimile transmission. It will be appreciated that the QUICK MEMO option thus provides a notepad upon which to compose short messages. This option is implemented using programming techniques well known in the art.

When the QUICK MEMO option is first selected, address book 80 is displayed within workspace 60. A user selects an addressee in the manner described above. Alternatively, a user can enter a new receiver fax number in fax number field 101.

Once the recipient has been selected, the QUICK MEMO menu 106 display changes and a message field 107 appears. The user can then type the brief message using keyboard 12. When the message has been composed, the fax transmission is initiated by pressing Start button 22.

As indicated above, electronic documents can also be transmitted via facsimile transmission using the Fax feature of integrated office system 10. The manner in which this is accomplished requires a brief discussion of the file system used by the integrated office system software.

In a preferred embodiment, this file system is similar to the MACINTOSH operating system used in MACINTOSH personal computers produced by Apple Computer, Inc., of Cupertino, Calif. Under this system, as is familiar to those skilled in the art, documents are created using application programs running on the computer. As discussed above, integrated office system 10 comprises a personal computer of the MACINTOSH variety. Thus, application programs, such as word processing programs, can be installed on hard drive 45 or loaded via floppy drive 44 in the conventional manner. When in use, the application program is loaded into memory 47. Documents are then created and stored in files. In the MACINTOSH operating system, these files are represented by icons displayed on the computer screen.

The system software for the integrated office system 10 is similar to an application program in that it is stored on hard drive 45 and loaded into memory 47 when the system is booted up. A user can switch between the office environment and the regular MACINTOSH operating system environment by pressing environment switching button 26 on front panel 14 (see FIG. 3). In response to this user input, the state of the office features environment is saved in memory 47 and CPU 42 recalls the MACINTOSH operating system program instructions from memory 47. In this fashion, integrated office system 10 switches from its office environment to its MACINTOSH environment.

When in the MACINTOSH environment, a user can select documents created using other application programs, e.g., a word processing program. These documents can be transferred from their normal storage location, e.g., a folder containing all documents created using the word processing program, to a special folder used by integrated office system 10 to store documents to be faxed. This transfer can be accomplished using well known "click and drag" techniques using cursor control device 13. When all of the desired documents have been transferred to the "to be faxed" folder, the user returns to the office features environment by pressing environment switching button 26. In response, CPU 42 stores the state of the Macintosh operating system in memory 47 and recalls the previously stored state of the office features environment. Through this process, the user is returned to the same place in the office environment from which the user exited. The process of storing and retrieving the appropriate environment locations is implemented using programming techniques well known in the art.

Once the user has transferred the documents to be faxed into the appropriate folder and has returned to the office environment, the process of faxing these electronic documents can take place. Referring to FIG. 13a, the user selects the DOCUMENTS option by selecting the DOCUMENTS tab 108 using navigation button 19 or cursor positioning device 13. When selected, DOCUMENTS tab 108 will be highlighted and DOCUMENTS menu 109 will be displayed within workspace 60 on screen 16. As shown in FIG. 13a, a list of documents 110 will be displayed within DOCUMENTS menu 109. This list 110 will correspond to the documents placed in the "to be faxed" folder.

The user selects the document to be faxed using navigation button 19. In this manner the documents in list 110 can be thought of as suboptions. Using the navigation button 19 (or the cursor positioning device 13), the user highlights the document to be faxed. To start the fax transmission, the user presses start button 22. Transmission can be terminated by pressing stop button 23. In this fashion, electronic documents can be sent via facsimile using modem 54.

VI. The Copy Feature

A user can select the Copy feature by pressing the appropriate hardbutton 20 on the front panel 14 of the main housing 11. As indicated above, the Copy feature can also be selected by positioning the pointer over the Copy icon 64 using the trackball 32 and clicking on the icon. Once the Copy feature has been selected, the various menus associated with the options of this feature are displayed within the workspace 60. As shown in FIG. 14, in a preferred embodiment, options and menus for copying original documents, scanning original documents, copying and scanning original documents, copying electronic documents, and scanner setup are provided. As described above, each menu has its associated tab 66 displayed at the top of the screen 16, arranged left to right from most frequently used to least frequently used, with the SCAN SETUP tab 111 being the right-most on the screen 16. Only the currently selected option menu will be displayed within the workspace, however, all of the option tabs 66 are displayed.

Using the navigation button 19 in the manner described above, a user selects an option. The first time the Copy feature is selected, and occasionally thereafter, a user will likely want to customize the scanner features. To accomplish this, the user selects the SCAN SETUP tab 111 using the navigation button 19 or the trackball 32. When the SCAN SETUP tab 111 is selected, the SCAN SETUP menu 112 is displayed in the workspace 60.

As shown in FIG. 14, SCAN SETUP menu 112 contains a number of suboptions which can be selected using the navigation button 19. As is the case for all of the option menus for each of the features of the integrated office system 10, the suboptions are arranged vertically, from the top of the screen 16 to the bottom. This arrangement is required so that the cursor can be moved over the suboptions using the navigation button 19 in the manner described above.

Although SCAN SETUP menu 112 might contain any number of suboptions, in a preferred embodiment, suboptions which allow a user to select scanner contrast and paper type are included.

As with all of the option menus for the features of integrated office system 10, SCAN SETUP menu 112 allows a user to select from among various suboptions using graphically displayed decision boxes 74, well known in the art. Although these decision boxes 74 could allow a user to select a feature by placing an "X" in a box, as shown in FIG. 14, the decision boxes 74 could also be implemented to allow a user to place a mark in a circle. If no mark is placed in the circle the feature is not selected. Regardless of the type of decision box used, the boxes are implemented using conventional programming techniques well known in the art.

FIG. 14 shows five such decision boxes 74. One of these decision boxes, 113, is marked, as would be the case if the navigation button 19 were used to position the screen cursor over decision box 113 and, with the cursor so positioned, the suboption represented by decision box 113 selected using a separate button (e.g., Start button 22) located on the front panel 14.

In the example shown in FIG. 14, the suboption "Medium" has been selected as indicated by the marked decision box 113. This selection indicates that the user has selected medium contrast for documents to be scanned in. In accordance with this selection, the software running on integrated office system 10 configures the circuitry associated with the copier and scanner options appropriately.

A user selectable suboption for the type of paper to be copied and/or scanned is also included. Using this suboption, the user indicates the type of paper (e.g., legal or letter sized) to be scanned in. The software then configures the scanner and copier logic appropriately. It will be appreciated that other suboptions could be provided.

Figure 15:
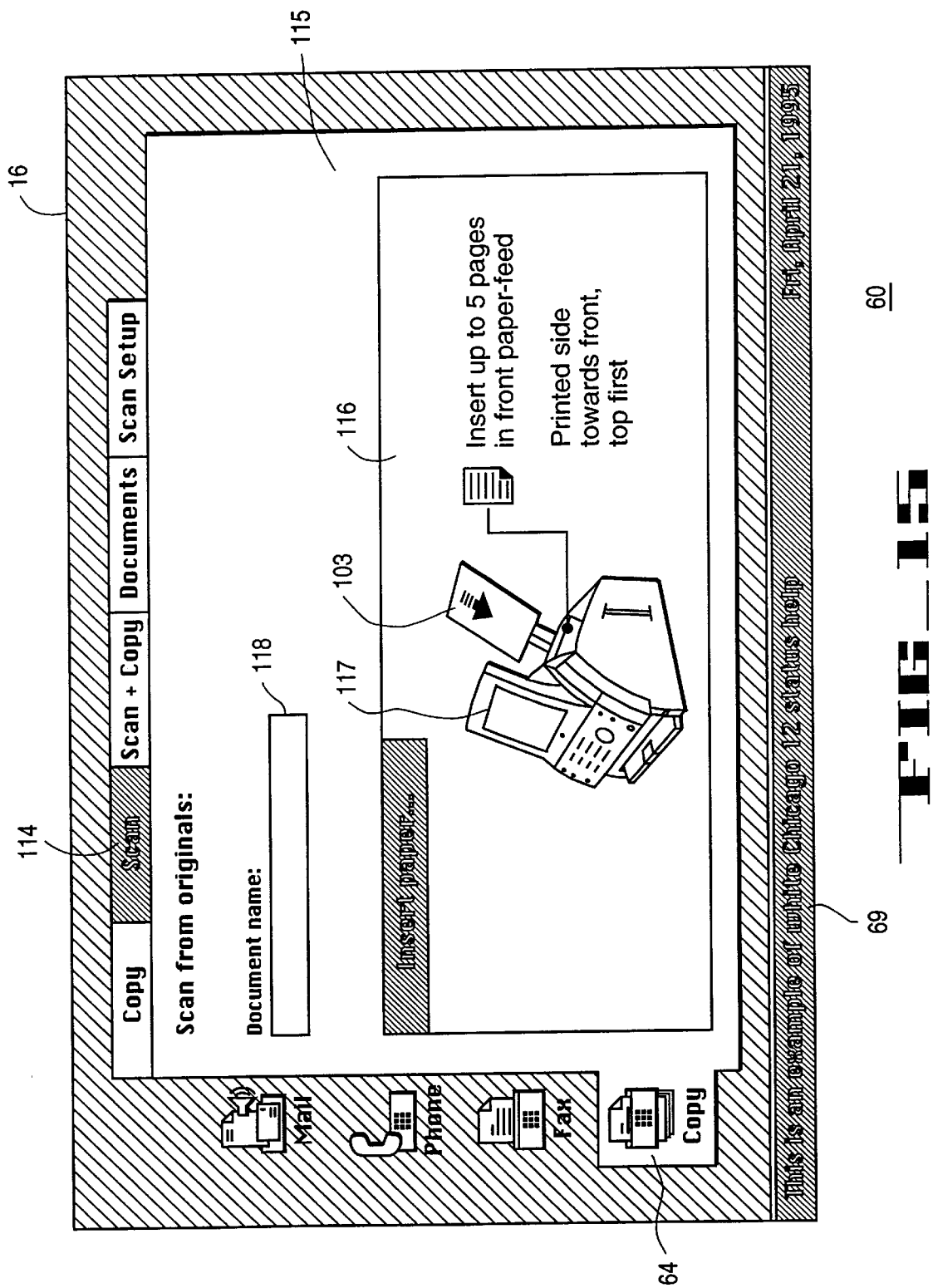
FIG. 15 illustrates the SCAN menu of the present invention and shows an animated help illustration.

Referring to FIG. 15, the SCAN option will be described. The SCAN option allows a user to scan a document without making a copy. That is, using this option, a paper document is scanned into integrated office system 10 where it will be stored (e.g., on hard disk 45) in electronic form. Like all other options, the SCAN option and its associated menu 115 is selected using the navigation button 19 to highlight the SCAN tab 114 as shown in FIG. 15.

When the SCAN tab 114 is selected, SCAN menu 115 is displayed within workspace 60 on screen 16. Using the navigation button 19, the user selects the document name field 118. At this point, a name for the document to be scanned can be entered using keyboard 12. It will be appreciated that the document name entered in document field 118 will become the name of the electronic document that results when the original is scanned in. The electronic document will typically be stored in the office documents folder described above.

Once a document name has been entered, the original document is fed into the scanner mechanism via sheet feeder 37. As shown in FIG. 15, an illustration 117, is displayed within a field 116 in the workspace 60. The illustration 117, in a preferred embodiment, depicts integrated office system 10 and includes an animated sheet of paper 103. The sheet of paper 103 moves on screen 16 so as to give the appearance of being inserted into sheet feeder 37. This illustration 117, which is implemented using conventional programming techniques, is designed to alert the user that the document to be scanned must now be inserted. Illustration 117 can be thought of as an adjunct to the help message displayed in message line 69.

With the original document in place, scanning commences when the user presses the Start button 22. As the document is fed through the scanner mechanism and across contact image sensor 56, the optical information is digitized under the control of scanner controller 55. This digitized information is then stored on hard drive 45 as an electronic document in the conventional manner. As the original document passes through the scanner mechanism, it emerges through slot 40, underneath front panel 14 (see FIG. 3). Rollers 41 are provided to accommodate this operation and prevent paper path jams. Retractable paper tray 130 is provided to collect the paper as it emerges from slot 40.

The newly scanned document can be viewed on screen 16 within workspace 60 by selecting the DOCUMENTS option of the Copy feature. When this option is selected, a list of scanned in documents is presented. The appropriate document is selected using the navigation button 19 or cursor positioning device 13. To view the document, the user presses the Start button 22.

A print suboption may be presented at this point to allow the user to print a copy of the electronic document. The printing is accomplished in the conventional fashion. The electronic document is provided to printer controller 48. Printer controller 48 controls printer 44 and provides appropriate signals to generate characters on the page. In one embodiment, printer 44 is an ink jet printer. A blank page is passed through the paper path from rear sheet feeder 38. As the blank page moves across the printer head, ink is transferred from the printer head to the page, thus forming the characters. The newly printed page emerges via slot 44. It will be appreciated that other printers, for example a laser printer, could be used.

The COPY option is discussed with reference to FIG. 16. The COPY option allows a user to make a paper copy of a document without saving an electronic copy. That is, using this option, a paper document is scanned into integrated office system 10 where it will be stored temporarily (e.g., in memory 47) in electronic form. Immediately thereafter, a copy of the scanned document will be printed in a manner similar to that discussed immediately above. Afterward, the electronic form of the document is deleted.

Like all other options, the COPY option and its associated menu 119 is selected using the navigation button 19 to highlight the COPY tab 118 as shown in FIG. 16. When the COPY tab 118 is selected, COPY menu 119 is displayed within workspace 60 on screen 16.

Using the navigation button 19, the user selects the number of copies field 120. At this point, the number of copies to be printed can be entered using keyboard 12.

Once the number of copies has been entered, the original document is fed into the scanner mechanism via sheet feeder 37. As shown in FIG. 16, an illustration 117, is displayed within a field 116 in the workspace 60. The illustration 117, in a preferred embodiment, depicts integrated office system 10 and includes an animated sheet of paper 103. The sheet of paper 103 moves on screen 16 so as to give the appearance of being inserted into sheet feeder 37. This illustration 117, which is implemented using conventional programming techniques, is designed to alert the user that the document to be scanned must now be inserted. Illustration 117 can be thought of as an adjunct to the help message displayed in message line 69.

With the original document in place, scanning commences when the user presses the Start button 22. As the document is fed through the scanner mechanism and across contact image sensor 56, the optical information is digitized under the control of scanner controller 55. This digitized information is then stored in memory 47 as an electronic document in the conventional manner. As the original document passes through the scanner mechanism, it emerges through slot 40, underneath front panel 14 (see FIG. 3). Rollers 41 are provided to accommodate this operation and prevent paper path jams. Immediately thereafter, a new copy is printed as described above and the electronic document is deleted from memory 47.

As indicated in FIG. 16, a SCAN+COPY option and associated tab 121 are also provided. This option allows a user to scan an original, print a copy or copies, and also save an electronic copy of the document. It has menus and suboptions similar to those discussed above.

VII. The Computer Feature

As discussed above, integrated office system 10 incorporates a general purpose personal computer. In a preferred embodiment, this is a MACINTOSH personal computer. The circuitry and operation of such a computer is well known in the art, insofar as the personal computer is capable of running traditional application programs. Referring to FIGS. 17 to 30, the operation of the personal computer under the direction of the integrated office system software will be described.

Referring first to FIG. 17, the power up and environment switching operation is described. The process begins at step 150. As indicated at step 152, operation will only commence if a power source is available. If no power is available, no operation occurs and the process quits at step 154.

If power is available, the process checks to determine whether the power is on at step 156. If power is on, the system checks to see if it is in a wake state at step 160. If so, the process continues at step 162 as described below. Otherwise, the system waits until a wake command is given, e.g., using Wake button 27 on front panel 14 (see FIG. 3).

If power is not on, the process loops through steps 156 and 158 until the power is turned on. Once the power is turned on for the first time, the process moves to step 166 and performs a boot cycle. It will be appreciated that the boot cycle at step 166 comprises loading the operating system from hard drive 45 into memory 47. Various circuit checks are also performed and any error conditions noted. Other operations, discussed below, will also be conducted at this step.

Once the computer has booted up, the process moves to step 168 where the computer enters the office features environment. While in this environment, the integrated office system 10 is capable of performing all of the office functions described above. The computer remains in this operating environment until it is either shut off at step 180 or the environment switching button 26 is pressed.

When the environment switching button is pressed, the integrated office system 10 enters the computer environment at step 162. As discussed above, the state of the office environment is stored in memory. While in the computer environment, integrated office system 10 performs computer operations at step 164. This continues until the system is switched back to the office environment or the system is powered down.

When the system receives a shut off command at step 180 it enters power down cycle 182. During this time, open documents are saved as are environment states. Other operations, discussed below, are also performed at this time.

Boot cycle 166 is described further with reference to FIG. 18. The cycle begins at step 200. At step 202, diagnostics well known in the art are run. These diagnostics check the health of the integrated office system 10 circuitry. If the diagnostics are passed, the process continues at step 204 where the printer is reset. The MACINTOSH operating system is loaded at step 206 and the last saved setup is restored at step 208.

At step 210, the MACINTOSH desktop is rebuilt. This involves operations well known in the art and results in the desktop being temporarily displayed. The process then moves to step 212 where the office features application program is loaded into memory 47 and the last saved office features state is restored at step 214. This involves resetting all of the prior user customizations. In one embodiment, the process ends at steps 216 and 218 with the integrated office system 10 entering the Mail mode, however, any other feature could be used as the default.

As indicated above, integrated office system 10 enters the office environment operations at step 168. The processes which take place during this phase of the operation are discussed further with reference to FIG. 19.

The office environment is entered at step 300. At step 302, the system checks to see if the user has selected the Mail function. This selection might occur via one of the manners discussed above. If the Mail function has been selected, the process proceeds to step 304 and Mail operations (discussed further below) are conducted. Otherwise, the process moves to step 306 where a check is made to determine whether the user has selected the Phone feature. If the Phone feature was selected, the process moves to step 308 where Phone operations are carried out (discussed in detail below). If the Phone feature was not selected, the process moves to step 310 where a check is made to determine whether the Fax feature has been selected. If the Fax feature has been selected, the process moves to step 312 where Fax operations are conducted. Fax operations are discussed in more detail below. If the Fax feature was not selected, the process moves to step 314 where a check is made to determine whether the Copy feature was selected. If so, the process moves to step 316 where Copy operations are performed. These Copy operations are discussed further below. If the Copy feature was not selected, the process moves to step 318 and returns.

As indicated at step 320, the Phone feature is automatically selected whenever the phone is taken off-hook. The phone can be taken off-hook in either of two ways: First, the handset 17 can be lifted out of cradle 18. Second, the speakerphone can be activated by pressing the speakerphone button 28 on front panel 14 (see FIG. 3). Once activated, the speakerphone operates using microphone 52 and speaker 53. Microphone 52 converts audio input to electrical signals which are then transmitted over the telephone line in the customary fashion. Speaker 53 provides audio output in response to electrial input, i.e., received telephone communications. When the phone is taken off-hook at step 320, the process moves to step 322 to determine whether the speakerphone has been activated. If the speakerphone has been activated, the integrated office system circuitry is configured for speakerphone operation at step 324 and Phone operations are commenced as discussed below. If the speakerphone was not selected, the integrated office system circuitry is configured for handset operations at step 326 and Phone operations are commenced.

Mail operations are described with reference to FIGS. 20 and 21 and commence at step 400. At step 402, the process checks to see whether the user has selected the MAIL IN option as described above. If so, the process moves to step 404 where a check is made to determine whether new messages are present. If there are no new messages, the user is allowed to review a list of old messages at step 406. If new messages are present, the process moves to step 408 where a check is made to determine whether the new message is a fax or a voice mail message. If the new message is a voice mail message, the message is played back at step 414. If the new message is a fax message, the user is given the option of reviewing the fax on screen or printing it out at step 410. If the user chooses to view the fax on screen, the process displays the fax on screen 16 within workspace 60 at step 416. If the user chooses to print the fax, the print operation is performed at step 412.

If the user chooses the MAIL OUT option, the process continues at step 418. At step 420, the user is allowed to view a list of outgoing messages at step 420. This list is displayed within workspace 60 as described above. The user can review a list of old messages at step 422 or can select printing at step 424. If printing is selected the print operations occur at step 426. Otherwise, the message is displayed on screen 16 at step 428.

The MAIL LOG option is selected at step 430 using the methods described above. At step 432 the user decides whether or not to review a particular message. If no particular message is selected, a list of old incoming and outgoing messages is displayed at step 434. If a particular message is selected, the user is given the option to print the message at step 436. If printing is selected, the printing operation is performed at step 426. Other wise, the message is displayed on screen 16 at step 440.

The ADDRESS option is selected in the manner described above at step 442. At step 444, a check is made to determine whether the user has selected the new address suboption. If so, the user enters the new address information into address book 80 (or other database) at step 450. Otherwise, a check is made to determine whether the user is seeking to edit an existing entry in address book 80. If editing has been selected, the new information is added at step 452. If no editing is to occur, the user is allowed to review the address information at step 448.

The MAIL SETUP option is selected at step 454. At step 456, the user indicates whether integrated office system 10 is to be configured to receive fax transmissions. If so, the system is so configured at step 458. At step 460, the user determines whether the system is to be configured so as to receive voice mail messages. If so, the system is so configured at step 462. At step 464, the user determines whether fax transmissions are to be printed as they are received. If so, the system is configured accordingly at step 466. At step 468, the user determines whether faxes are to be deleted after they are printed. If so, the system is so configured at step 470. The number of days after which incoming mail is automatically deleted is set at step 472 and the system is configured accordingly at step 474. Similarly, the number of days after which outgoing mail is to be deleted is set at step 476 and the system is so configured at step 478. It will be appreciated that these operations correspond to the suboptions presented in MAIL SETUP menu 73 as described above.

The operations performed by the computer when the Phone feature is selected are described with reference to FIGS. 22, 23 and 24. The Phone feature is selected at step 500. At step 502, a check is made to determine whether the user has selected the DIAL option. If so, the process moves to step 504 where a check is made to determine whether the user is placing a call to the phone number currently displayed in phone number field 93. If so, the process moves to step 512 where the user places the call by pressing the Start button 22 on front panel 14. The call is transacted at step 516 and, upon completion of the call, a record of the call is entered in the message log at step 518.

Alternatively, the user might select a manual call at step 506. If so, the user dials the new phone number at step 514, for example using telephone keypad 21. Yet another method of placing the call is indicated at step 508 where an addressee is selected from address book 80. The call is then placed at step 510 by pressing Start button 22.

At step 520, the process checks to determine whether the user has selected the REDIAL option. If so, the process moves to step 522 where a check is made to determine whether the user is placing a call to the phone number currently displayed in phone number field 93. If so, the process moves to step 526 where the user places the call by pressing the Start button 22 on front panel 14. The call is transacted at step 528 and, upon completion of the call, a record of the call is entered in the message log at step 530. Another method of placing the call is indicated at step 524 where an addressee is selected from address book 80.

As shown in FIG. 23, the process checks to determine whether the user has selected the PHONE SETUP option at step 532. If so, the number of rings before answer is set at steps 534 and 536. The maximum permissible length of a voice mail message is set at steps 538 and 540. At step 542, a user is allowed to perform operations relating to the greeting. If this suboption is selected, for example by manipulating navigation button 19 until the appropriate suboption is highlighted on PHONE SETUP menu 88, the process moves to step 544 to determine whether the user has indicated if a new greeting is to be recorded. If no new greeting is to be recorded, the old greeting can be played back at step 546. If a new greeting is to be recorded, the operation is carried out at step 548.

At step 550, the type of dialing can be selected. At step 552, the system determines whether the user has selected pulse or tone dialing. If pulse dialing was selected, the process moves to step 556 and the phone circuitry is configured to conform to conventional pulse dialing operations. If tone dialing was selected, the process moves to step 554 and the phone circuitry is configured accordingly.

Referring to FIG. 24, the user is allowed to select the type of ring at step 558. If a custom ring is to be recorded, as indicated at step 560, the new ring is recorded at step 562. If an existing ring is to be used, the process moves to step 564 to determine whether the current ring is to be used. If not, a new ring is selected at step 566.

At step 568, the user can configure the phone logic to automatically dial special tags. For example, at step 570, the user indicates whether a specific prefix is to be dialed automatically for every phone number. Often, a number, e.g., 9, will have to be dialed before an outside call can be placed. If such a prefix is needed, it is entered at step 572. At step 574, the user indicates whether any special suffix needs to be automatically dialed for each call. This might be the case if a billing number needs to be entered before a call is routed. If such a suffix is needed, it is entered at step 576. The process returns at step 578.

Fax operations are described with reference to FIGS. 25, 26 and 27. The Fax feature is selected at step 600 in the manner described above. At step 602, a check is made to determine whether the user has selected the SEND option. If so, the process moves to step 604 to determine whether the fax is being sent to a new phone number or an existing number from address book 80. If the fax is being sent to a new number, the new number is entered at step 606. Otherwise an addressee is selected from address book 80 as described above. At step 608, the user decides whether or not a cover page is to be used. If so, the cover page is added at step 610. It will be appreciated that this is an electronically generated cover page. The addressee information is automatically transferred to the electronic cover page from address book 80 and the subject is input by the user. Once the cover page has been generated, or if no cover page is to be used, the process moves to step 612 where the fax is transmitted as discussed above. When the transmission has been completed, a record of the transmission is entered in the message log at step 614.

At step 616, the process determines whether the RESEND option has been selected. If so, a check is made to determine whether the retransmission is to be made to the number then currently displayed within workspace 60. If not, a new number is selected from the list of previously sent faxes. The fax retransmission is then made.

At step 622 the process checks to determine whether the QUICK MEMO option was selected. If so, the user selects the addressee and enters the message at step 624. The message is then transmitted.

At step 626, the process determines whether the DOCUMENTS option was selected. If so, the user selects the document of interest at step 628. At step 630, the user is given the suboption of viewing the document. If this suboption is selected, the document is displayed at step 632 on screen 16 within workspace 60. Such a display would resemble that shown in FIG. 13b. The document appears as a page displayed within workspace 60, superimposed over DOCUMENTS menu 109. The user can review the document by scrolling through it as is well known in the art. The scroll feature can be implemented as a suboption, thus allowing for the use of navigation button 19, or can be implemented using other means such as arrow keys on keyboard 12 or a button on front panel 14. After reviewing the document, if so desired, the user faxes the document to the addressee at step 634.

Referring to FIG. 26, the process checks to determine whether the user has selected the FAX SETUP option at step 636. If so, the various suboptions can be selected and the features customized at steps 638–656. At step 638, the user configures the integrated office system 10 so as to always include a cover page with fax transmissions. The current cover page is selected at step 640. At step 642, the user determines whether or not fax transmissions are to be deleted immediately after sending. If so, the system is configured appropriately at step 644.

At step 646, the process checks to determine if the user has selected the cover page suboption. If so, the process moves to step 648 and checks to determine if a cover page is to always be used. If so, the user has the option of choosing the current cover page at step 650 or selecting a new cover page at step 652. After selecting a cover page, the user can decide whether or not to view the cover page at step 654. If the view suboption is selected, the cover page is displayed on screen 16 at step 656.

At step 658, the process determines whether the user has selected the font suboption. If so, the user is permitted to choose the type of font for the fax header information at step 660.

At step 662, the process determines whether the user has selected the quality suboption. If so, the print quality is selected at step 664.

At step 666, the process determines whether the user has selected the paper type suboption. If so, the paper type is entered at step 668. The process returns at step 670.

Copy operations are described with reference to FIG. 28. The Copy feature is selected at step 700. At step 702, the process determines whether the user has selected the Copy option. If so, the number of copies are entered at step 704 and the copies are printed at step 706. Printing copies involves first scanning in the original and then printing a new copy as discussed above.

If the SCAN option has been selected at step 708, the scanning operation occurs at step 710. Once the document has been scanned, it is saved as an electronic document on hard disk 45 at step 712.

The COPY+SCAN option is selected at step 714. The number of copies is entered at step 716 and scanning then occurs at step 718. When scanning is complete, the electronic document is saved to hard disk 45 at step 720 and the process moves to step 706 where the copies are printed.

The DOCUMENTS option is selected at step 722. When selected, the user is presented with a list of electronic documents at step 724 as discussed above. The document of interest is selected. The user has the option of viewing the document at step 726. If so desired, the document is displayed on screen 16 within workspace 60 at step 730. The resulting image resembles that shown in FIG. 13b. After reviewing the document, if desired, the user decides whether to print the document at step 728. If printing is selected, the process moves to step 706 and treats the print request as though a copy operation was requested. The document is then printed.

At step 732, the process determines whether the user has selected the SCAN SETUP option. If so, the user is allowed to select the size suboption at step 734. If so selected, the user can specify the paper size at step 736. The user can also select the contrast suboption at step 738 and specify the desired scan contrast at step 740. The process returns at step 742.

Referring to FIG. 29, computer operations are discussed. As indicated above, when integrated office system 10 is placed in the computer environment at step 800, it functions as a general purpose personal computer. Computer operations are launched in the customary fashion at step 802 and application programs are run at step 804. At step 806, the integrated office system 10 ceases operating in the computer environment and the process returns.

As indicated at step 808, the Phone feature is automatically selected whenever the phone is taken off-hook, even though the system is operating in PC mode. As discussed above, when the phone is taken off-hook at step 808, the process moves to step 810 to determine whether the speakerphone has been activated. If the speakerphone has been activated, the integrated office system circuitry is configured for speakerphone operation at step 812 and Phone operations are commenced. If the speakerphone was not selected, the integrated office system circuitry is configured for handset operations at step 814 and Phone operations are commenced.

Power down operations are discussed with reference to FIG. 30 and commence at step 900. At step 902 the printer head is parked. At step 904, the office environment states are stored and the office environment software is quit at step 906. At step 908 the computer environment states are stored and the computer is shut down at step 910. Finally, the hard drive 45 is shut down at step 912 and the process quits at step 914.

Thus, a novel all-in-one integrated office system user interface has been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A user interface system in an integrated office system the integrated office system including a general-purpose computer, a display unit, a printer, an optical input device, a communication device, telephone logic, voice mail logic, and a housing containing the computer the printer, the optical input device, the communication device, the telephone logic, and the voice mail logic, the computer having a processor and a memory coupled to the processor, the user interface system comprising a grid system, the grid comprising possible user functions for the integrated office system, the grid comprising a plurality of rows along a first axis and a plurality of columns along a second axis, the first axis being orthogonal to the second axis, for each of said plurality of rows, each column within said row having a plurality of subrows, wherein each of the plurality of rows corresponds to a major feature of the integrated office system, wherein each of the columns within each row corresponds to an option for the corresponding major feature of said integrated office system, wherein each of said subrows within a column corresponds to a suboption for the corresponding option of the corresponding major feature of the integrated office system, and wherein an active cell of the user interface system being displayed on said display unit, the active cell being defined as the intersection of a selected row and a selected column, wherein each of the plurality of major features of the integrated office system corresponds to one of a plurality of hardbuttons, each of the plurality of hardbuttons coupled to the processor, and wherein selecting a first one of the hardbuttons causes the processor to execute instructions stored in the memory thereby activating the major feature of the integrated office system corresponding to the selected hardbutton, wherein once a major feature of the integrated office system has been activated by selection of a corresponding first one of the plurality of hardbuttons, options within said major feature can be accessed by a user according to the grid system wherein each of the options of the selected major feature of the integrated office system are accessed using a four-way navigation button, the four-way navigation button being coupled to the processor, and wherein the four-way navigation button permits horizontal movement between the columns of a row within the grid system thereby allowing a user to select from among the plurality of options for the selected major feature of the integrated office system, and wherein the four-way navigation button permits vertical movement between the subrows of a column within the grid system thereby allowing a user to select from among the plurality of suboptions for each option of the selected major feature, and wherein the four-way navigation button does not permit movement between rows of the grid system of the user interface system.

* * * * *